US006944150B1

(12) United States Patent
McConnell et al.

(10) Patent No.: US 6,944,150 B1
(45) Date of Patent: Sep. 13, 2005

(54) METHOD AND SYSTEM FOR PROVIDING SERVICES IN COMMUNICATIONS NETWORKS

(75) Inventors: Von K. McConnell, Leawood, KS (US); Kenneth C. Jackson, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 913 days.

(21) Appl. No.: 09/708,836

(22) Filed: Nov. 8, 2000

Related U.S. Application Data

(60) Provisional application No. 60/187,273, filed on Mar. 6, 2000, and provisional application No. 60/185,601, filed on Feb. 28, 2000.

(51) Int. Cl.[7] .............................................. H04L 12/66
(52) U.S. Cl. ...................................... 370/352; 370/493
(58) Field of Search ................................ 370/352, 353, 370/354, 355, 356, 357, 495, 494, 493, 465; 707/227, 224, 203, 202, 10

(56) References Cited

U.S. PATENT DOCUMENTS

| | | | |
|---|---|---|---|
| 6,078,581 A | | 6/2000 | Shtivelman et al. |
| 6,366,577 B1 | * | 4/2002 | Donovan .................... 370/352 |
| 6,434,143 B1 | * | 8/2002 | Donovan .................... 370/356 |
| 6,477,150 B1 | * | 11/2002 | Maggenti et al. ........... 370/312 |
| 6,493,324 B1 | * | 12/2002 | Truetken .................... 370/261 |
| 6,577,622 B1 | * | 6/2003 | Schuster et al. ............ 370/352 |
| 6,601,099 B1 | * | 7/2003 | Corneliussen ............... 709/224 |
| 6,625,141 B1 | * | 9/2003 | Glitho et al. ............... 370/352 |
| 6,678,264 B1 | * | 1/2004 | Gibson ....................... 370/352 |
| 6,678,517 B2 | * | 1/2004 | Naim et al. .............. 455/414.1 |
| 6,680,943 B1 | * | 1/2004 | Gibson et al. .............. 370/392 |
| 6,681,252 B1 | * | 1/2004 | Schuster et al. ............ 709/227 |
| 6,694,145 B2 | * | 2/2004 | Riikonen et al. ........... 455/502 |

FOREIGN PATENT DOCUMENTS

| | | |
|---|---|---|
| EP | 1 003 343 A1 | 5/2000 |
| WO | WO 98/36542 | 8/1998 |
| WO | WO 00/22792 | 4/2000 |
| WO | WO 00/22793 | 4/2000 |

OTHER PUBLICATIONS

International Preliminary Examination Report from International Application No. PCT/US01/47942, dated Feb. 8, 2004.

Nortel Networks News Release, Nortel Networks Introduces Voice Over IP (VolP) Capabilities on Internet Call Waiting Service, http://www.nortelnetworks.com/corporate/news/newsreleases/1999a/2_22_9999111_icw.html, printed from the World Wide Web on Mar. 13, 2001.

(Continued)

*Primary Examiner*—Douglas Olms
*Assistant Examiner*—Ricardo M. Pizarro

(57) ABSTRACT

A method and system for providing services in communications networks. A gateway layer determines information about a communication session and responsively sends a signaling message to a session manager, providing the information. The session manager may then send a signaling message to a service agent, also providing the information. The service agent may in turn apply a set of service logic based at least in part on the information, so as to derive a service treatment, and the service agent may send a signaling message so as to cause an enforcement engine (such as the gateway or session manager) to carry out the service treatment. Advantageously, this arrangement may facilitate imposition of services across various types of communication sessions (such as voice sessions and/or data sessions) and access networks (such as circuit-switched and/or packet-switched), at session initiation and during the course of an ongoing session. A variety of useful services may thereby be provided.

33 Claims, 6 Drawing Sheets

OTHER PUBLICATIONS

Nortel Networks News Release, Don't Miss a Call While Online with Sprint Internet Call Waiting, http://www.nortelnetworks.com/corporate/news/newsreleases/06_22_0000381_sprint_icw.htm, printed from the World Wide Web on Mar. 13, 2001.

Nortel Networks News Release, Nortel Networks Enables Fast, Efficient Delivery of Hot, New Internet Services, http://www.nortelnetworks.com/corporate/news/newsreleases/19... /10_28_9999629_itag.htm, printed from the World Wide Web on Mar. 13, 2001.

Nortel debuts Internet Call Waiting, http://www.zdnet.com/eweek/news/1201/03enort.html, printed from the World Wide Web on Mar. 13, 2001.

Doshi, B. T. et al., "Protocols, Performance, and Controls for Voice Over Wide Area Packet Networks," Bell Labs Technical Journal, pp. 297–320 (Oct.–Dec. 1998).

Rosenberg, J. D. Shockey, R., "The Session Initiation Protocol (SIP): A Key Component for Internet Telephony," Computer Telephony.com, pp. 124–139 (Jun. 2000).

McCann, P. J. and Hiller, T., "An Internet Infrastructure for Cellular CDMA Networks Using Mobile IP," IEEE Personal Communications, pp. 26–32 (Aug. 2000).

Perkins, C. E., "Mobile IP Joins Forces with AAA," IEEE Personal Communications, pp. 59–61 (Aug. 2000).

Patel, G. and Dennett, S., "The 3GPP and 3GPP2 Movement Toward an All–IP Mobile Network," IEEE Personal Communications, pp. 62–64 (Aug. 2000).

Softswitch, Application Working Group, "Services Architecture," pp. 1–6, dated before Nov. 8, 2000.

Girard, G. D. and Hoffpauir, S., "SIP Telephony Service Interface Overview," Iperia, Broadsoft, pp. 1–12 (Mar. 24, 2000).

Kutscher et al., Internet Draft "Requirements for Session Description and Capability Negotiation," pp. 1–16 (Jul. 14, 2000).

Faramak Vakil et al., Host Mobility Management Protocol Extending SIP to 3G–IP Networks, Internet Draft, Oct. 1999.

Mun Choon Chan and Thomas Y.C. Woo, "Next Generation Wireless Data Services: Architecture and Experience," IEEE Personal Communications, pp. 20–33, Feb. 1999.

Rudd Siebelink, "Towards a profile driven service authoring and adaptation platform," http://www.w3.org/2000/10/DIA Workshop/siebelink.htm, printed from the World Wide Web on Apr. 13, 2001.

S.L. Tombros et al., "Fixed Access to UMTS Service Capabilities," Apr. 1999.

3GPP, UMTS 22.07 V3.1.2, Mar. 1999.

* cited by examiner

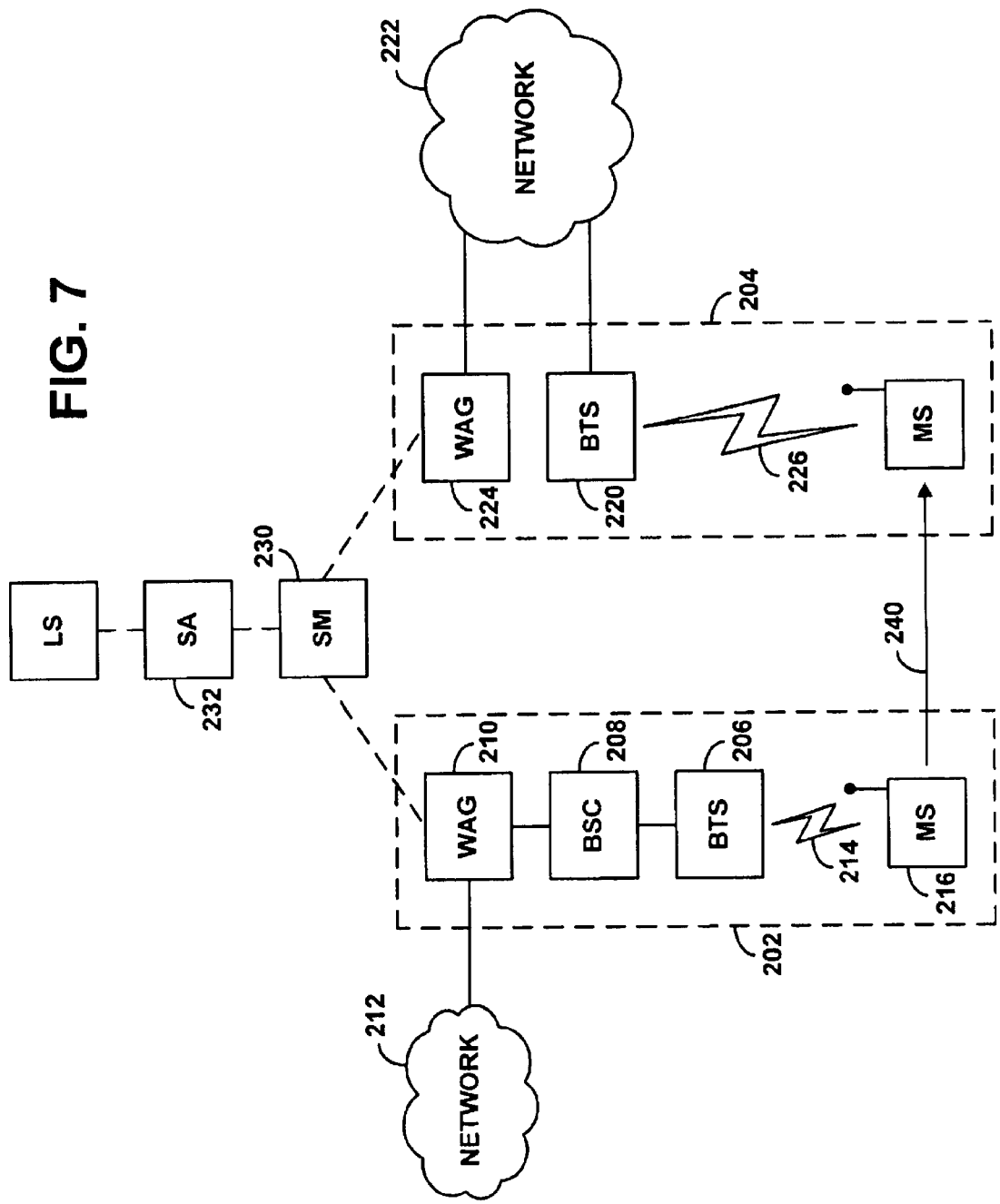

METHOD AND SYSTEM FOR PROVIDING SERVICES IN COMMUNICATIONS NETWORKS

REFERENCE TO RELATED APPLICATIONS

The inventors claim priority to the following applications, each of which is hereby incorporated herein by reference in its entirety:

U.S. Provisional Patent Application No. 60/185,601, filed Feb. 28, 2000, entitled "Next Generation Service and Mobility Control," and assigned to the assignee of the present invention.

U.S. Provisional Patent Application No. 60/187,273, filed Mar. 6, 2000, also entitled "Next Generation Service and Mobility Control," and assigned to the assignee of the present invention.

The following applications are also hereby incorporated herein by reference in their entirety:

U.S. patent application Ser. No. 09/410,869, filed Oct. 1, 1999, entitled "Method and System for Providing Telecommunications Services Using Mediated Service Logic," and assigned to the assignee of the present invention.

U.S. patent application Ser. No. 09/459,206, filed Dec. 10, 1999, entitled "Automatic In-Line Messaging System," and assigned to the assignee of the present invention.

U.S. patent application Ser. No. 09/595,595, filed Jun. 15, 2000, entitled "Private Wireless Network Integrated with Public Wireless Network," and assigned to the assignee of the present invention.

FIELD OF THE INVENTION

The present invention relates to communications networks and more particularly to methods and systems for providing services in such networks.

BACKGROUND

In many of today's communications networks, a subscriber terminal may communicate over a channel with a switch or other such entity and the switch may then set up and route communication traffic between the subscriber terminal and a communications network. The communications network may be circuit-switched (e.g., the legacy public switched telephone network (PSTN)) or packet-switched (such as the Internet or a corporate intranet, for instance) or a combination thereof. Further, the interface between the subscriber and the switch may take various forms, including but not limited to a wireless air interface (e.g., cellular radio-frequency, satellite, microwave, or the like) or a landline interface (e.g., twisted-pair copper wire, cable, etc.)

A subscriber terminal may be portable or fixed. A portable subscriber terminal (or "mobile station") may be used at various locations and might be arranged to be coupled with various interfaces or communication networks (e.g., via a network plug, docking station, or wireless interface). Common examples of a portable subscriber terminals include cellular handsets (e.g., cellular telephones), personal digital assistants (PDA), and notebook computers. A fixed subscriber terminal is usually fixed in one location, typically coupled with a specific network. Examples of fixed subscriber terminals include traditional landline telephones and desktop computers.

Some subscriber terminals are capable of communicating voice traffic, while others are capable of communicating data traffic, and still others are capable of communicating both voice and data traffic. By way of example, a traditional landline telephone will likely communicate voice traffic (e.g., the telephone can send speech signals into the PSTN), while a wireless PDA or notebook computer would likely carry data traffic (e.g., the PDA or notebook may provide a user interface for web-browsing on the Internet), and a cellular telephone might communicate both voice and data traffic (e.g., the cellular telephone may facilitate both voice-band telephone communications and web-browsing). These examples may vary, and other examples are possible as well or will be developed in the future.

Due in part to the historical development of communications networks, at least two separate architectures have arisen to handle the communication of voice and data traffic. Traffic that is characterized as voice has been handled in one way, while traffic that is characterized as data has been handled in another way. Voice traffic, for instance, is typically routed through a switch (such as a "service switching point" (SSP) or a "mobile switching center" (MSC) for instance) into the PSTN, for routing in turn to a remote switch and then to a recipient terminal. On the other hand, data traffic is typically routed to a data gateway such as a "packet data serving node" (PDSN) or network access server (NAS) for routing in turn over a packet-switched network or other data-centric network to a remote node.

In a typical arrangement, a switch that routes voice traffic may query a service control point (SCP) or subscriber home location register (e.g., HLR) to for guidance in routing a voice call. The SCP or HLR (as examples) may then refer to a subscriber profile and apply a set of enhanced service logic so as to determine how to handle the call, and may then instruct the switch accordingly. In contrast, a switch or gateway that routes data traffic may query a different control point—such as an authentication, authorization and accounting (AAA) server—to find out basic service level criteria, such as the bandwidth at which the data can be transmitted for instance.

Of course, the applicable architecture depends largely on how the communications are characterized, such as whether a given communication is characterized as voice or data. For instance, communications originating from traditional customer premises equipment in the plain old telephone system (POTS) may be characterized as voice. Notwithstanding this characterization, however, such communications may in fact represent data, such as when a computer modem communicates a modulated bit stream over a voice-band channel with a local telephone company switch. (Such communications may ultimately be connected through the PSTN with another modem, for handling in turn.)

As another example, communications originating from a computer coupled via a broadband cable modem or DSL connection with the Internet may be characterized as data. Notwithstanding this characterization, however, such communications may in fact represent voice (as in voice over IP (VoIP) or other packet-telephony systems). (Such communications may ultimately be connected through a gateway with a voice-band channel to an analog subscriber station for instance.)

The present inventors have recognized that the separate treatment of voice and data communications (or circuit-switched and packet-switched communications, for instance) can unfortunately lead to a partially redundant and often inefficient arrangement for imposition of services in communications networks. By way of example, it is often possible that a given user may own and/or operate both a data communications terminal and a voice communications terminal (which may be separate terminals or may be one in the same). To facilitate both voice and data service, the user may need to subscribe to functionally and architecturally separate systems. Therefore, there may be little if any interaction between the services provided in the respective system.

Further, the inventors have realized that, due to the historical separation between voice and data communications, some services that have traditionally been available for application to voice traffic are not available for data traffic. For example, while basic services such as call waiting, caller ID, call forwarding, voice mail and the like are now commonplace for voice calls, data sessions are being provided without the benefit of even those basic services. Further, data sessions are being provided without the benefit of more enhanced services such as pre-paid calling, and advanced call routing (e.g., 800-like call forwarding) for instance.

A need therefore exists for an improved arrangement for providing services to data sessions and for providing services integrally across assorted types of traffic such as voice and data.

SUMMARY

In order to provide a robust and extensible arrangement for imposing services in communications networks, an exemplary embodiment of the present invention introduces a system and method in which a common service agent function can manage and dictate service policies for traffic of all sorts (e.g., voice and data, circuit-switched and packet-switched, etc.) Preferably, the service agent function is maintained separately from any access functions and session control functions, so that the service agent function can derive service treatments that can be enforced across a variety of access and session control media.

According to the exemplary embodiment, a network architecture is provided in which one or more gateways serve as an interface between subscriber terminals and communications networks, and in which one or more session managers serve to set up and control communications conducted by the gateways. The exemplary embodiment further provides a service agent layer, separate from the session managers. Service logic and profiles are maintained or accessed by the service agent, so as to govern services that are imposed by the session managers or gateways. Further, a location server layer may be provided separate from the service agent. The location server layer may maintain information on the locations of subscriber terminals (e.g., latitude-longitude information, or indications of the cells or network ports where various terminals are located). The service agent layer may refer to the location server layer to obtain information useful to assist in deriving service treatments. For example, if a given subscriber terminal is in a given location, the service agent may determine one service treatment, while, if the given subscriber terminal is in another location, the service agent may determine a different service treatment.

In an exemplary embodiment, when a gateway receives a voice and/or data session initiation request, the gateway may send a signaling message to the session manager, seeking to set up the session. The signaling message will carry information about the proposed communication session. Rather than, or in addition to, conventionally setting up the session, the session manager may then send a signaling message to the service agent or otherwise provide the service agent with information about proposed session. The service agent may then apply a set of service logic, based in part on the information for instance, and may thereby determine a service treatment.

Further, during the course of an ongoing voice and/or data session, the gateway may acquire information about the session, and that information may be used similarly to enable the service agent to derive a service treatment. In this regard, traffic of all sorts (e.g., voice traffic, data traffic, etc.) can be represented as a packet sequence. A gateway may receive or generate the packets of the sequence to be routed to or from one or more subscriber terminals. The gateway may extract or otherwise obtain information from or defined by one or more of the packets of the sequence and may forward the information in a signaling message to a session manager.

The session manager may in turn forward the information in a signaling message, or send a subsequent signaling message, to a service agent. In turn, the service agent may apply a set of service logic based on information extracted or obtained from the packet(s), and based on a subscriber profile and/or subscriber location (e.g., as indicated by a location server), so as to derive a service treatment. The service agent layer may then send a signaling message to the session manager and/or another entity, so as to direct the enforcement of the designated service treatment.

The service treatment determined by the service agent layer may take any of a variety of forms. As examples, the service treatment can be: (i) blocking the communication session, such as preventing it from starting or continuing, (ii) blocking a handoff of the communication session from one serving system to another, (iii) imposing a quality-of-service level, such as a bandwidth restriction or allowance, for the communication session, (iv) rerouting the communication session, such as to a different network address than proposed, (v) pulling back the communication session from a given network address (e.g., upon exhaustion of a prepaid account balance, or to stop undesirable communication of payload mid-session), and/or (vi) pushing content, such as messages (e.g., advertisements, notices, etc.), into the communication session.

In a further aspect of the exemplary embodiment, the service agent layer may comprise a service agent entity, such as a programmed computer server for instance, which has access to subscriber profiles and service logic. Further, the service agent preferably acts as a service portal, from or through which requests for service guidance can be passed. The service agent may, for instance, forward a signaling message that it receives from a session manager on to a subscriber terminal's home service agent or to a service platform, feature server or other policy engine in any suitable network (such as a service provider on the Internet), which may in turn apply service logic so as to derive a respective service treatment and then send back to the service agent a signaling message indicating the service treatment. The service agent may, further, seek assistance from several other entities at once and may act to manage interaction between services dictated by the various entities.

Advantageously, the service agent layer may thus serve as a policy repository for both voice and data traffic for instance, suitable for dictating services based at least in part on information derived from the communications themselves. Further, by integrating both voice and data policies into a common service layer, it becomes possible in the exemplary embodiment to efficiently provide an assortment of beneficial services, such as Internet call waiting, data forwarding, air interface control, and handoff control, for instance.

Thus, in one respect, an exemplary embodiment of the present invention may take the form of a method for providing services in a communications network. The method may involve sending a signal to a service agent upon initiation of (i.e., in response to a request to initiate, or at initiation of) a communication session (e.g., a voice session or a data session), the service agent then executing a set of service logic and thereby determining a service treatment, and then one or more entities carrying out the service treatment. Further, the method may involve determining information about the communication session as it is ongoing and sending a signal to the service agent, the service agent then executing a set of service logic and determining another service treatment, and then one or more entities carrying out the other service treatment.

In another respect, the method may involve a first entity extracting information about a communication session and sending the information to a second entity, which then sends the information to a third entity. The third entity may then apply service logic based at least in part on the information and thereby derive a service treatment, and the third entity may then send a message indicating the service treatment to the second entity. The service treatment may then be imposed.

In yet another respect, an exemplary embodiment of the invention may take the form of a service agent layer that maintains a record of states (e.g., start time, traffic type, etc.) of communication sessions associated with a particular subscriber or subscriber terminal. That record may indicate that the subscriber is currently engaged in a data session (such as a web-browsing session for instance). The service agent layer may then receive information indicating that the subscriber is invited to participate in a voice session. The service agent layer may be programmed to responsively determine that a message or other content should be pushed into the subscriber's current data session (such as a message being popped up on the subscriber's computer screen) notifying the subscriber of the incoming voice call. The service agent layer may further be programmed to send to a network entity (such as a session manager or gateway for instance) a signaling message indicating that the content should be pushed into the data session.

In still another respect, an exemplary embodiment of the invention may comprise a method for imposing services in a communications network. The method may involve acquiring information about a communication session based on at least one data packet associated with the session (such as header information (e.g., values included in the packet header section) or payload information (e.g., values included in the packet payload section)), and providing to a service agent a first signaling message indicating the information. Based at least in part on the information, the service agent may then determine a service treatment, which may then be imposed.

These and other exemplary features and advantages of the present invention will become apparent to those of ordinary skill in the art, by reading the following detailed description with reference where appropriate to the accompanying drawings.

BRIEF DESCRIPTION OF THE DRAWINGS

An exemplary embodiment of the present invention is described herein with reference to the drawings, in which:

FIG. 7 is a block diagram illustrating two serving systems and handoff of a mobile station from one system to another, in an arrangement according to an exemplary embodiment of the present invention.

DETAILED DESCRIPTION OF AN EXEMPLARY EMBODIMENT

A. Exemplary System Architecture

Figure 1:
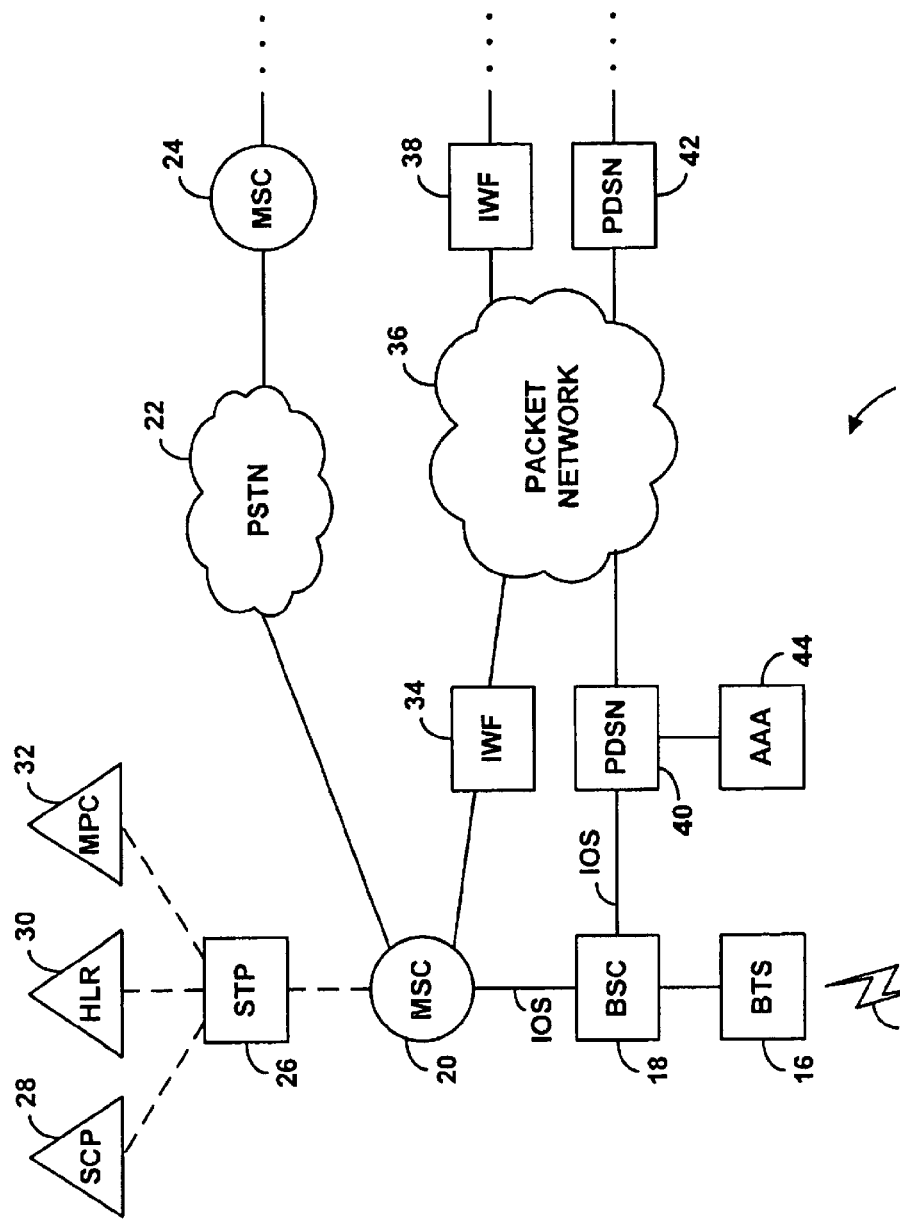
FIG. 1 is a block diagram illustrating an exemplary wireless communications network.

An exemplary embodiment of the present invention will be described mainly with respect to wireless communications, although it should be understood that the invention can be extended equally to use with respect to landline communications or a combination of wireless and landline communications. To set a framework, FIG. 1 illustrates an example of a basic wireless communications network 10, arranged to serve a subscriber terminal that is capable if communicating both voice and data traffic. In FIG. 1 and the other figures, solid lines between network entities represent payload or bearer channels (e.g., for user signals), while dashed lines between network entities represent signaling channels (e.g., for network management).

Referring to FIG. 1, network 10 is shown to include a mobile station 12, which communicates via an air interface 14 with a base transceiver station (BTS) 16. As is known in the art, the BTS includes an antenna that produces a radiation pattern defining a cell and/or sector in which mobile station 12 is assumed to be operating. BTS 16 in turn communicates with base station controller (BSC) 18, which may typically function to aggregate and control traffic via a plurality of BTSs (not shown). BSC 18 then communicates with a mobile switching center (MSC) 20, which serves to set up and connect calls with other switches. MSC 20 is thus coupled with (or sits as a node on) the PSTN 22, as do other switches such as exemplary MSC 24 also shown in FIG. 1.

Normal voice traffic coming from mobile station 12, for instance, typically travels over the air interface 14 (typically according to a well known protocol such as CDMA, TDMA, AMPS or the like) to BTS 16. The traffic then passes to BSC 18 and in turn to MSC 20 as a baseband (e.g., a time division multiplexed bit stream) signal. MSC 20 then functions to convert the signal to a pulse code modulated (PCM) signal and to route the signal over a trunk through PSTN 22 to another switch such as MSC 24. The other switch may then convert the PCM signal back to a baseband signal and route the signal in turn to another subscriber terminal, thereby completing a communications path.

MSC 20 is also typically coupled through an out-of-band signaling network (e.g., CCS7) through one or more signal transfer points (STPs) such as STP 26 shown in FIG. 1. The signaling network provides connectivity with various platforms, such as an SCP 28, an HLR 30 and a mobile positioning center (MPC) 32 (which may maintain information about the locations of mobile stations). These various platforms may provide MSC 20 with guidance for call processing. In addition, the signaling network provides connectivity between MSC 20 and MSC 24 (connectivity not shown), so that the MSCs can communicate with each other to facilitate setting up and tearing down calls.

Data traffic, in contrast, is typically sent via a packet-switched network. Various arrangements for such data connectivity are known. As shown in FIG. 1, for example, MSC 20 can be coupled with an interworking function (IWF) 34 to a packet-switched network 36, which may be coupled in turn to another IWF 38 (and then to another MSC) or to any other entity on the packet switched network. In this arrangement, MSC may receive a baseband signal representing data traffic from MS 12, for instance, and may forward the signal to IWF 34, which may convert the signal into a packet sequence suitable for transmission over network 36, and vice versa.

As another example, also shown in FIG. 1, BSC 18 may be coupled to a packet data serving node (PDSN) 40, which may then be coupled to a packet-switched network such as network 36. PDSN 40 may then receive a baseband signal or packet sequence from BSC 18 and may route a corresponding sequence of packets into network 36 for receipt by a remote PDSN (such as exemplary PDSN 42 as shown in FIG. 1 for instance) or by any other entity on the packet switched network. PDSN 40 may further be coupled with an authentication, authorization and accounting (AAA) server via a RADIUS, Diameter or other interface, to which the PDSN can refer so as to verify that a given subscriber is authorized to communicate data over the packet network, to track the subscriber's usage, and/or to obtain quality-of-service parameters governing the transmission of the subscriber's data over the packet network.

Figure 2:
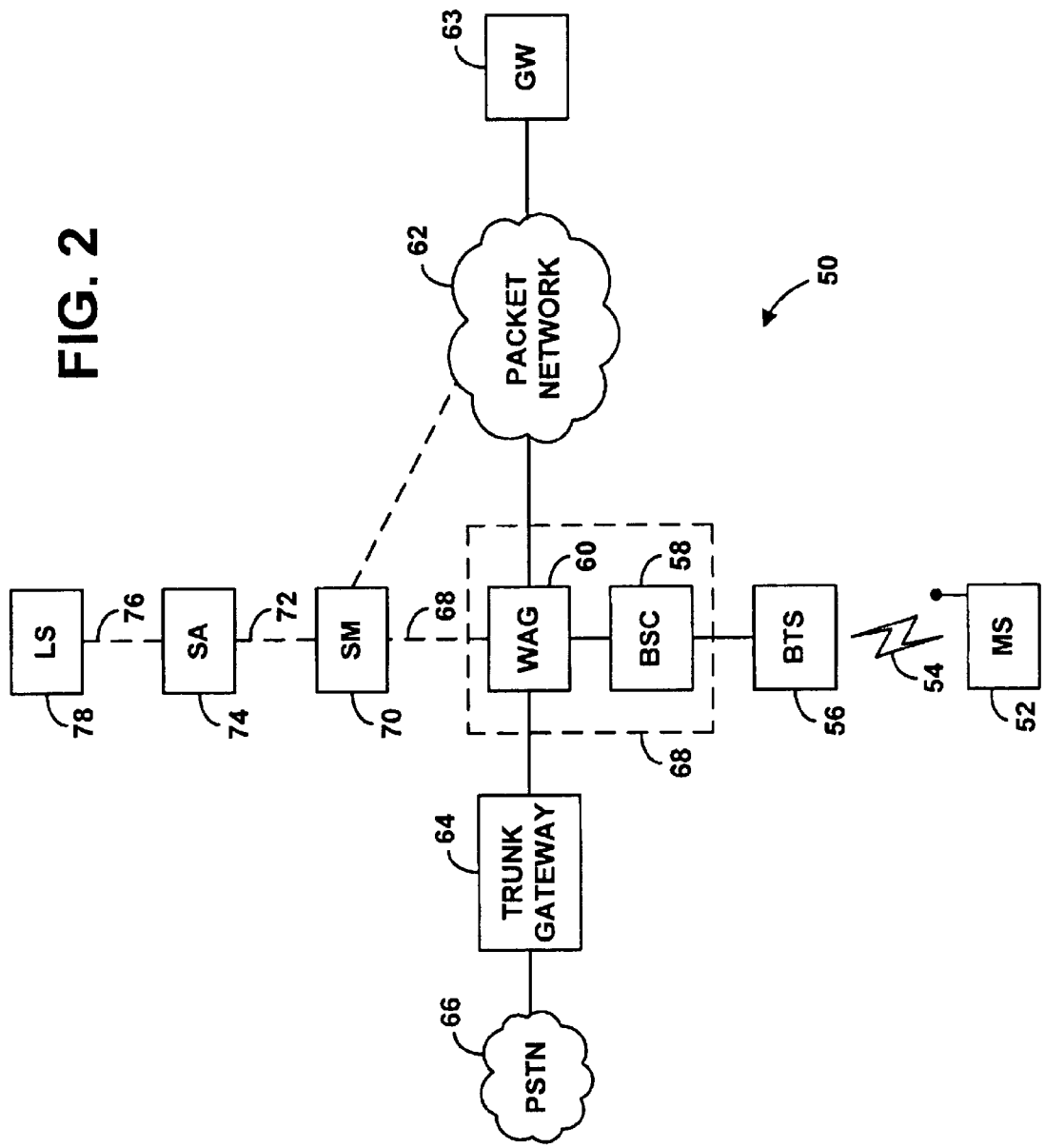
FIG. 2 is a block diagram illustrating a system arranged in accordance with an exemplary embodiment of the present invention.

Referring now to FIG. 2, there is shown a simplified block diagram of a telecommunications network 50 arranged to operate according to an exemplary embodiment of the present invention. It should be understood that this and other arrangements described herein are shown for purposes of illustration only, and those skilled in the art will appreciate that other arrangements and other elements (e.g., machines, interfaces, functions, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location. For example, where two entities are shown coupled by an interface, other intermediate entities or interfaces may be provided. Other examples are possible as well.

Still further, various functions that will be described herein as being performed by one or more entities may be carried out by a processor executing an appropriate set of machine language instructions stored in memory. Provided with the present disclosure, those skilled in the art can readily prepare appropriate computer instructions to perform such functions.

As shown in FIG. 2, exemplary network 50 includes a mobile station 52, coupled via an air interface 54 to a BTS 56. The BTS 56 is in turn coupled to a BSC 58, which is then coupled to a wireless access gateway (WAG) 60. WAG 60 then sits on a packet-switched network 62.

In one embodiment, the air interface 54 is a channelized interface (as in conventional CDMA systems for instance). BTS 56 receives signals from MS 52 over that interface, and the signals may pass as baseband signals (e.g., time division multiplexed (TDM) bit streams) to WAG 60. Alternatively, in a more robust embodiment, the air interface 54 is a packet-switched interface such as an IP interface for instance. BTS 56 might then receive traffic as a sequence of IP packets from mobile station 52, and those packets may pass to WAG 60. In that event, the BSC 58 as a separate functional entity may disappear or may more likely be integrated into the WAG, so as to produce a combined WAG/BSC entity (sometimes referred to simply as a WAG), designated by the dashed box 68 in FIG. 2.

The WAG may function as an interface between a wireless communication system (such as BSC 58, BTS 56, air interface 54 and mobile station 52) and a communications network. In this regard, the WAG preferably functions to convert between signals suitable for communication with the wireless communications system and signals suitable for communication with the packet network 62. For instance, if the wireless communications system provides the WAG with baseband signals (e.g., PCM encoded signals or bit streams), the WAG may packetize the signals into a sequence of packets suitable for routing over packet network 62. As another example, if the wireless communications system provides the WAG with packetized signals, the WAG may route the packets of those signals over network 62, possibly first modifying the packets (such as by appending additional header information or otherwise modifying the packet headers).

Further, for signals that should be routed to or from the legacy PSTN 66, the WAG may be arranged to communicate with a trunk gateway 64, which may itself function to convert between packet-based signals and baseband signals suitable for communication over circuit-switched PSTN trunks. For instance, if the WAG receives a packetized signal from the wireless communications system or from the packet-switched network 62, and the signal is destined for a terminal served by the PSTN, the WAG may send the packetized signal to the trunk gateway 64; where the signal may be converted into a form suitable for communication to the PSTN. (Alternatively, the WAG itself or some other entity may serve the conversion function.)

In a given system such as system 50, the WAG preferably handles communications of any traffic that can be represented in a packet sequence for transmission over a packet-switched network. The traffic could be traditional voice traffic (e.g., digitized speech signals), traditional data traffic (e.g., computer-to-computer communications, video signals, fax transmissions, etc.), or any other form of traffic. Further, while a preferred exemplary embodiment employs a single WAG in a given system, more than one WAG could be employed. For instance, one WAG could be employed to handle voice traffic, while another WAG could be employed in parallel with the first WAG to handle data traffic. Other arrangements are possible as well.

Although the term "wireless access gateway" or "WAG" is used herein to denote an access gateway for wireless communications, it should be understood that other entities may equally serve as a WAG. For instance, a PDSN could be configured to serve as a WAG, converting between baseband signals and packetized signals suitable for transmission over a packet switched network. Thus, in one embodiment, for instance, a PDSN could be used as a WAG for purposes of interfacing between a wireless communications system and a packet-switched network. As another example, an IWF can also be arranged to serve as a WAG. Other examples are possible as well.

In operation, mobile station 52 may send traffic (e.g., CDMA encoded) via air interface 54 to BTS 56. The traffic may then flow from the BTS ultimately to the WAG. In turn, the WAG may convert the signal into a packetized form suitable for communications over network 62. The WAG may then route the packets of the signal over network 62 to a remote access gateway 63 on network 62, which may then receive and forward the packets or the underlying signal for receipt by a destination subscriber terminal.

Similarly, when the WAG receives from network 62 a packetized signal representing a communication addressed to mobile station 52, the WAG may convert the signal into a form suitable for communication to the BSC and/or BTS, so that the signal can be transmitted in turn to the mobile station 52.

Each packet that the WAG sends into packet network 62 or receives from packet network 62 will typically have a header portion and a payload portion. Conventionally, the header may include overhead (e.g., management) information, such as (i) a packet number indicating where in the sequence the packet falls, (ii) a quality-of-service indicator indicating a bandwidth allowance for transmission of the packet for instance, (iii) a terminal ID of the sending entity, (iv) a network address of the sending entity, (v) a terminal ID of the receiving/destination entity, (vi) a network address of a receiving/destination entity, and (vii) an indication of the type of traffic represented by the packet sequence, for example. The payload may then represent a portion of the underlying traffic.

Depending on various factors, such as the type of media being communicated and the type of session at issue, the packets of a session may take various forms. Typically, some advanced determination of packet structure will have been made, so that peer layers on the network can handle the packets. For instance, the lengths and positions of header parameters may be predetermined so as to facilitate transport of packets through the network. Similarly, the encoding and/or format of payload information may be predetermined, so as to facilitate proper decoding and handling of the information.

As a particular example, to initiate a data session with a particular web site on the Internet, a session initiation packet (or packets) might include in a predetermined header field a parameter (e.g., a predetermined control code) that indicates the packet is a session initiation packet and might then include in another predetermined field (such as in the header or payload section of the packet for instance) a network address (such as a URL (universal resource locator) or IP address). A network entity that receives such a session initiation packet may then responsively forward or otherwise handle the packet so as to facilitate initiating the desired session with the specified network address.

Further, a packet might indicate in a predetermined header parameter that the packet is part of a particular packet sequence or session, such as a given RTP session or FTP session for instance. A network entity that receives such a packet may therefore be able to determine the type or identity of the session.

As another example, during a data session, a packet or sequence of packets might indicate in a predetermined header parameter the type or version of encoder used to encode information in the payload section. (For instance, the parameter may indicate that media is encoded using G.723.1 or any other such protocol). A network entity that receives or otherwise handles such a packet or sequence may therefore be able to employ a suitable decoder to uncover the payload content of the packet(s).

According to the exemplary embodiment, the WAG is further coupled via a signaling channel 68 to a session manager 70, which is in turn coupled via a signaling channel 72 to a service agent 74. Service agent 74 may then be coupled via a signaling channel 76 to a location server 78. Although FIG. 2 depicts these various signaling channels as direct links, the links between the various entities, like other entities described herein, may take any of a variety of forms. For instance, the session manager 70, service agent 74 and location server 78 can respectively sit on one or more interconnected public or private packet-switched networks (such as the Internet, a telecommunication service provider's private network, or a corporation's local area network, for instance), so that communications with these entities may be transmitted as IP packets for example. Further, the session manager, service agent and/or location server may sit on packet network 62 or on another network.

Session manager 70 may generally function to set up and manage communication sessions over the packet network 62, for the WAG, for instance. Thus, for example, when the WAG receives a request from mobile station 52 to initiate a communication session over packet network 62, WAG 60 may send a session initiation request to session manager 70, which may then seek to set up a communication session over network 62 for the WAG. In particular, the session manager may engage in signaling communication via packet network 62 (or some other channel) with a remote session manager (not shown) or with remote gateway 63, seeking to set up a communication session. Once the session is set up, session manager 70 may then notify the WAG, the WAG may notify the mobile station 52, and communication may then commence via the WAG between mobile station 52 an a remote terminal over packet network 62.

As noted above, there may be more than one WAG (not shown in FIG. 2). Multiple WAGs may reference a common session manager such as session manager 70 for instance. In one embodiment, for instance, each of a plurality of given geographic areas may have its own voice gateway and data gateway and its own session manager. Each of the gateways may be arranged to receive respective traffic from subscriber terminals and to route a corresponding packet sequence into a packet-switched network, and vice versa. Both the voice gateway and data gateway may then be arranged to communicate with the session manager of the geographic area, so that the session manager can function to set up and tear down communication sessions for the gateway.

Further, there may be more than one session manager. For example, a given serving area might have a separate voice session manager and a separate data session manager. However, in an exemplary embodiment, the session manager functionality for all types of communication traffic is carried out by a single session manager entity (of one or more components).

According to the exemplary embodiment, service agent 74, in turn, preferably functions as a policy engine, dictating policies that are to be carried out by one or more enforcement engines, such as session manager 70 or WAG 60 for instance. For this purpose, the service agent may have access to a set of service logic and profiles, collectively defining services that are to be applied on a per-subscriber-terminal basis or other basis. Alternatively or additionally, the service agent may function as a service "portal," through which requests for service guidance may be forwarded elsewhere for processing, response and/or other action.

A provisioning system may be provided, to facilitate programming or provisioning service logic (and/or profiles of various sorts) in the service agent. The provisioning system may include a policy editor and a policy management module. The policy editor may comprise an intelligent user interface, available to administrators and/or subscribers (such as via the Internet for instance). The policy management module may then be arranged to control provisioning efforts made through the policy editor. For example, the policy management editor may be programmed to disallow more than a specified level of bandwidth (or other such service level) for a communication session during a particular time of day (such as when network congestion is likely to be high). The policy management module may then forward acceptable policies (e.g., logic and profiles) for reference and use by the service agent.

In any given system, there may be at least one service agent, which may maintain profiles and logic applicable for communications with terminals in that system. Further, a given terminal may have a home service agent in the terminal's home system (e.g., the system where the terminal first registered for service for instance), which may maintain profiles and logic applicable for that given terminal. Thus, for instance, when a service agent in a given system seeks to dictate services for that given terminal, the service agent may send a signaling message over to the terminal's home service agent (which the service agent may identify by reference to a centralized server that indicates home systems per subscriber or subscriber terminal for instance) and may receive a service directive back from that home service agent. More generally, a service agent could make remote procedure calls or forward service-request signaling messages to any service platform via any suitable channel.

In the exemplary embodiment, session manager 70 may send a signaling message via channel 72 to service agent 74. Service agent 74 may then apply a set of service logic (itself and/or through outsourcing to other entities) so as to determine an action or service treatment to be taken. Service agent 74 may then send a signaling message to session manager 70 and/or to another entity; indicating an action to be taken. One or more entities may then carry out the designated action. In any given system, there may be one or more session managers, each of which may be arranged to signal to a given service agent for instance.

As a general matter, whether the service agent is a single computer or a complex combination of computers and other entities, and whether the service agent serves as a portal through which service-request signaling messages may be passed or otherwise sent for processing, the service agent may be considered to represent a service agent layer. Advantageously, the service agent layer is preferably the policy engine of an exemplary system. Service logic that would otherwise have been carried out by other layers, such as a session manager or a WAG is preferably carried out at the service agent layer, thereby effectively facilitating access-independent and session-independent service logic.

Further, in the exemplary embodiment, location server 78 preferably maintains a record of the locations of mobile stations or other subscriber terminals. The location may be an indication of network address (such as when a portable terminal is plugged into a port of a given network for instance) or an indication of cell/sector or latitude/longitude (such as when a mobile station is located at a given position in a wireless communications system for instance) or may take still other forms. When the service agent seeks to apply its service logic, the service agent may query the location server to find out the location of one or more mobile stations or other terminals and may use that location information to effect its determination of a service treatment.

Figure 3:
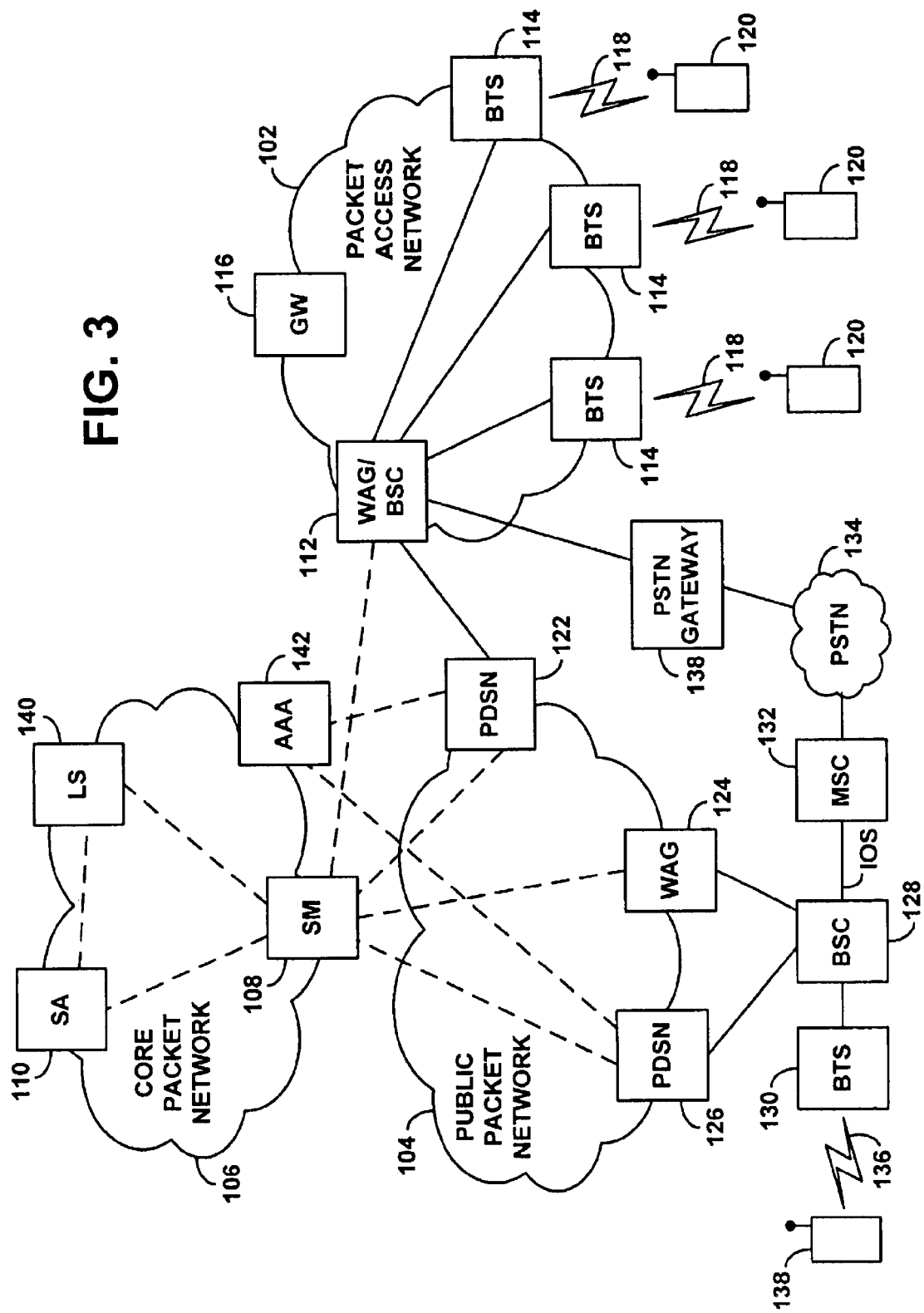
FIG. 3 is a block diagram illustrating another system arranged in accordance with an exemplary embodiment of the present invention.

Referring now to FIG. 3, there is shown a more detailed network arrangement for employing an exemplary embodiment of the present invention. The arrangement of FIG. 3 includes three packet-switched networks, (i) a packet access network 102, (ii) a public packet network 104 and (iii) a core packet network 106. These packet switched networks are preferably coupled together through appropriate firewalls or other entities. In this regard, or alternatively, the networks could all be part of one network. Thus for instance, both the packet access network 102 and the core packet network 106 could be part of the public packet network 104, and all could be on the Internet for example. Other arrangements are possible as well.

In the exemplary embodiment, packet-based traffic (such as voice or data communications) may traverse the packet access network 102 and/or the public packet network 104. Entities on either such networks may then engage in signaling communication with a session manager 108 on the core packet network 106, which may in turn engage in signaling communication with a service agent 110 on the core packet network. The service agent may then apply a set of service logic and derive a service treatment and may then signal the service treatment back to the session manager 108, which may carry out the service treatment and/or signal to an entity on the packet access network 102 or public packet network 104.

Exemplary packet access network 102 is shown to include a WAG 112, three BTSs 114 and a gateway 116. Each of the BTSs preferably communicates over a packet-switched air interface 118 with a packet-capable mobile station (i.e., a mobile station able to communicate over the packet-switched air interface with a BTS) 120. Thus, packetized communication traffic (voice and/or data) may pass from mobile station 120 to BTS 114 and over network 102 to WAG 112, and vice versa. For traffic that is to be transmitted into the public packet network 104, WAG 112 may then forward the packet traffic to a PDSN 122 on the public packet network 104, (Alternatively, air interface 118 may be a more conventional channelized interface, and WAG 112 may receive baseband or other non-packetized signals from BTS 114, in which case WAG 112 may convert the signals to a packetized form suitable for communication over a packet network.)

Gateway 116 is shown merely as an example of another node on access network 102 (as there may be any number of other nodes on any of the networks shown). Gateway 116 may take various forms and serve various functions. By way of example, gateway 116 may be a local area network (LAN) server. In that event, for instance, packet access network might be a private corporate LAN. An assortment of other entities may then sit on network 102 and may be served by gateway 116 for instance. The function of gateway 116 may equally be integrated into WAG 112 as well.

Public packet network 104, which may be the Internet, for instance, is shown to include PDSN 122, a WAG 124 and, another PDSN 126. PDSN 122 may serve as an interface into network 104 for WAG 112, as noted above. PDSN 126 may then serve as an interface into network 104 for a legacy wireless communications network that may include a BSC 128 coupled to a BTS 130 and an MSC 132. (Alternatively; this interface may be provided via the packet access network 102.) MSC 132 may be conventionally coupled to the PSTN 134, and BTS 130 may be coupled via an air interface to a conventional mobile station 136. Further, WAG 112 on the packet access network may be coupled via a PSTN trunk gateway 138 to the PSTN 134 as well.

Core packet network 106, in turn, is shown to include session manager 108, service agent 110, a location server 140 and a AAA server 142. As one of many possible alternatives, AAA server 142 (or any other entity) may be located on the public packet network 102 instead. Like the entities described above with reference to FIG. 2, session manager 108 preferably functions to set up and manage communication sessions, service agent 110 preferably functions as a policy engine, and location server 140 preferably functions to maintain location information. AAA server, in turn, conventionally serves to maintain service level parameters and authorization criteria for various subscriber terminals.

In the exemplary arrangement shown in FIG. 3, WAGs 112 and 124 may each be arranged to send a signaling message to session manager 108 (or to respective session managers (others not shown)). Session manger 108 may in turn be arranged to send a signaling message to service agent 110. And service agent 110 may then be arranged to apply service logic, in view of one or more applicable subscriber profiles and/or location information from location server 140, for instance, so as to determine a service treatment. The service agent may then signal to one or more designated entities (such as session manager 108 for instance), which may then carry out the service treatment. Further, exemplary PDSNs 122 and 126 (also functioning as WAGs for instance) may each send a signaling message to session manager 108, thereby facilitating a determination of service treatment as well.

In the exemplary arrangements of FIGS. 2 and 3, the signaling messages described above can take any of a variety of forms. For example, the messages could take the form of SIP (session initiation protocol) messages, details of which are specified by the well known Session Initiation Protocol industry standard. In this regard, for instance, a mobile station or other subscriber terminal may programmed with an application to function as a SIP client, i.e., a terminal that may communicate with a SIP server so as to establish a communication session. In turn, both the WAG and the session manager may function as a SIP proxy servers, which may pass along session initiation requests (from the mobile station to the session manager and on to another network entity) to facilitate session set up.

However, while the session manager might normally then be arranged to pass such a session initiation request message to a remote session manager or gateway on a transport network, in an effort to set up the requested communication session, the session manager may instead or additionally pass the session initiation request (or a new such request) up to the service agent, which may then apply service logic and determine a service treatment. (Note that, if desired, the initiation of the session may take place in parallel with the application of service logic by the service agent, i.e., without waiting for the service agent to complete its task.)

The service agent may in turn also function as a SIP proxy server. In particular, after modifying the session initiation request to embody the designated service treatment, and/or after sending some other service treatment directive message for instance—the service agent may send the session initiation request back down to the session manager. The session manager may then carry out a service treatment indicated in the request for instance, and/or may possibly forward the request on to an appropriate remote gateway or terminal and/or may send a signaling message down to the WAG to facilitate execution of the designated service treatment.

For instance, a session initiation request may comprise a SIP "INVITE" message. Thus, a SIP-capable subscriber terminal A may send an INVITE message indicating a desire to establish a voice and/or data communication session with another terminal B. The INVITE message may, for instance, identify terminal A, terminal B, and the type of session desired (such as a data session, a voice session, or the like). A WAG may receive that message and may forward the INVITE message up to a session manager. According to an exemplary embodiment, the session manager may then forward the INVITE message up to a service agent. In this process, the WAG (e.g. a modified PDSN) and/or the session manager may query a AAA server or other such entity so as to obtain information such as basic service-level parameters and/or subscriber authorization, and the WAG and/or session manager may insert that information into the INVITE message (and/or, equivalently, generate a new INVITE message that contains such information as well).

When the service agent receives the INVITE message, preferably containing information about the proposed session (such as inviting-terminal address, invited-terminal address, session type, and service level information, for instance), the service agent may then apply an appropriate set of service logic, in view of one or more subscriber profiles and/or subscriber location information, and thereby determine an applicable service treatment. The service agent may then modify the INVITE-message so as to reflect the service treatment. For example, if the INVITE message includes a service level parameter, the service agent may change the service level parameter to reflect a different service level for the communication. As another example, the service agent may change the invited-terminal address. Other examples are possible as well.

As a SIP proxy server, the service agent may then forward the INVITE message back to the session manager. The session manager, the WAG, and/or any other policy enforcement entity or entities may then carry out the designated service treatment. Alternatively, the service agent may send a SIP "OK" message or other such message(s) to the session manager or another designated entity, indicating the applicable service treatment. Further, still other signaling messages are possible as well.

Figure 5:
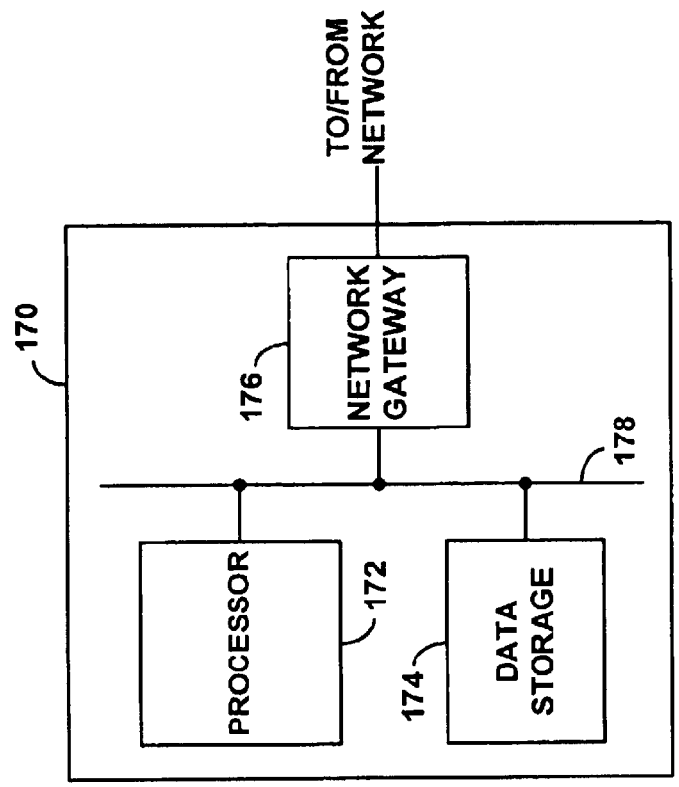
FIG. 5 is a block diagram illustrating an exemplary session manager.
Figure 4:
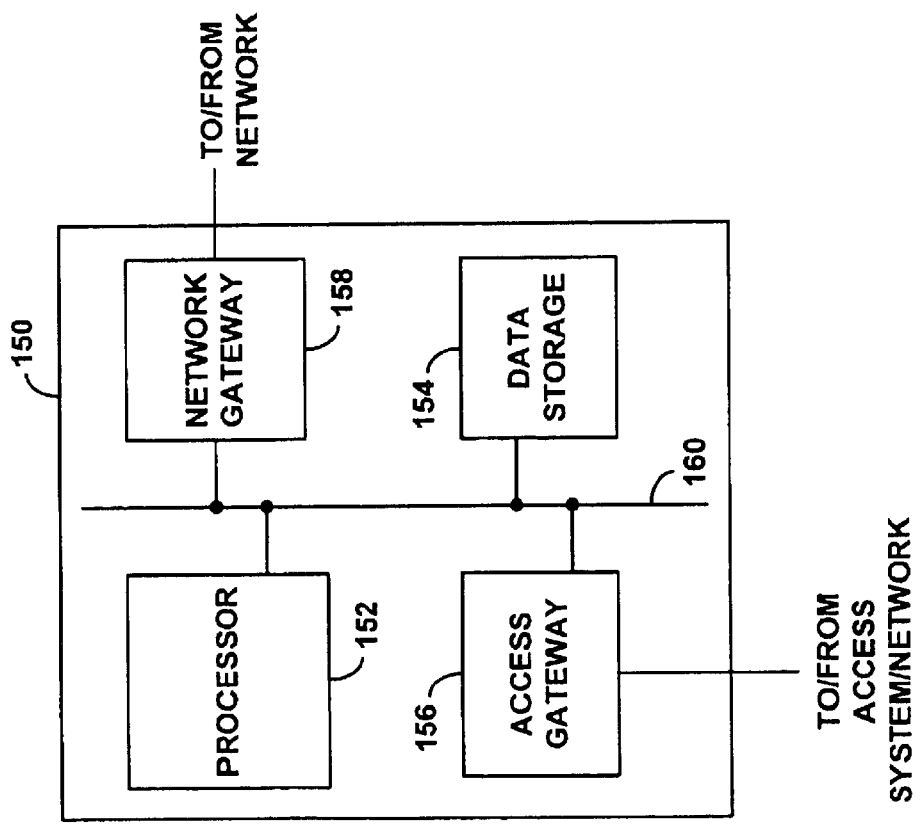
FIG. 4 is a block diagram illustrating an exemplary access gateway.
Figure 6:
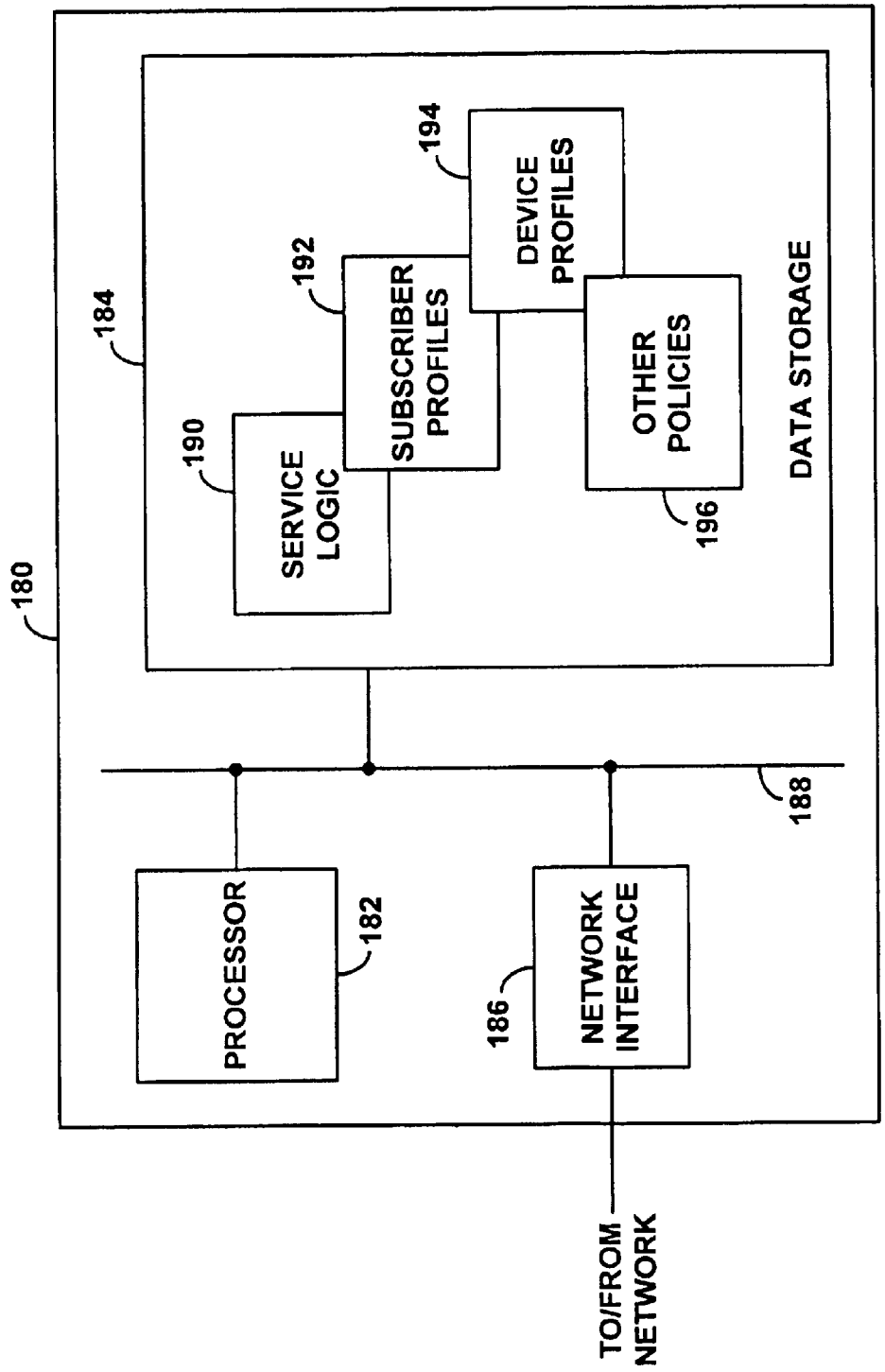
FIG. 6 is a block diagram illustrating an exemplary service agent.

Turning now to FIGS. 4, 5 and 6, there are shown simplified block diagrams illustrating exemplary arrangements of a WAG, a session manager, and a service agent. The elements shown for each entity may be integrated into a single computer for instance, or may be distributed throughout a number of computers or platforms. For instance, where a data storage medium is shown, the medium may itself comprise a number of separate storage elements, databases and/or database servers. As another example, where a single processor is shown, it could in fact comprise a number of processors. Particular arrangements are not meant to be crucial but are only described for purposes of example.

Referring first to FIG. 4, an exemplary WAG 150 is shown. WAG 150 may include, for instance, a processor 152, a data storage medium 154, an access gateway 156 and a network gateway 158, all of which may be communicatively coupled together via a system bus 160. The data storage medium 154 may comprise a memory and/or other storage facility (such as optical or magnetic storage for instance) and may contain program instructions (e.g., machine language instructions defining one or more routines) and other data. The processor 152 may be arranged to execute the program instructions stored in the data storage medium so as to carry out various functions described herein. Further, in doing so, the processor 152 may employ parameters defined by other data stored in the data storage medium.

The access gateway 156 of WAG 150 may be any network interface suitable for facilitating communication ultimately with one or more subscriber terminals. The network gateway 158 of the WAG, in turn, may be any network interface suitable for facilitating communication with a network, so as to allow the WAG to send and receive bearer data and to communicate signaling messages with a session manager for instance. Gateways 156 and 158 may be integrated together, and/or other gateway elements may be included as well.

Referring now to FIG. 5, an exemplary session manager 170 is shown. Session manager 170 may include, for instance, a processor 172, a data storage medium 174, and a network interface 176, all of which may be communicatively coupled together via a system bus 178. As in the WAG described above, data storage medium 174 may contain program instructions and data, which may be executed and used by processor 172 to carry out functions described herein. Network interface 176 in turn conventionally allows the session manager to communicate with a network, suitable to allow the session manager to communicate with a WAG and a service agent for instance.

Referring next to FIG. 6, an exemplary service agent 180 is shown. Service agent 180 may include, for instance, a processor 182, a data storage medium 184, and a network interface 186, all communicatively coupled by a system bus 188. Exemplary data storage medium 184 is shown to include service logic 190, subscriber profiles 192, device profiles 194, and other policies 196. In a given instance, processor 182 may execute the program logic 190, based at least in part on parameters specified by subscriber profiles 192, device profiles 194, policies 196, information concerning a proposed or ongoing communication session, and perhaps location information provided by a location server.

Network interface 186 (which may comprise a number of separate network interface modules for instance) may function to allow service agent 180 to communicate via a network with one or more session managers, a location server, other service agents and/or other service platforms, and/or other entities. Thus, through network interface 186, the service agent may communicate signaling messages with a session manager and may act as a service portal as described above.

Service logic 190 may include one or more routines that processor 182 may execute in order to determine a service treatment and to establish a signaling message that may be used to convey the service treatment to a policy enforcement engine. Further, service logic 190 may include logic that enables processor 182 to outsource service processing tasks, such as to forward signaling messages for processing by other service platforms for instance, and to manage the interaction between service logic employed by various other entities. For instance, if the service agent sends signaling messages to two entities, and one entity returns a message indicating that a particular data session should be blocked at any time, while the other entity returns a message indicating that the particular data session should be blocked between certain hours of the day, logic 190 may cause processor 182 to harmonize the two service treatments by determining that the data session should be blocked at any time. Other examples are possible as well.

Subscriber profiles 192 may take various forms as well. By way of example, each subscriber profile may take the form of a relational database record that define service parameters for a given subscriber (such as a person or company) that subscribes to telecommunications service. In that regard, a given subscriber profile may specify the following information (by way of example only):

(1) SUBSCRIBER IDENTIFIER. An identification of the subscriber, such as a unique subscriber number.

(2) TERMINAL IDENTIFIERS. Identification, such as respective serial numbers, of some or all subscriber terminals (of various types, for instance) owned or operated by the subscriber;

(3) SUBSCRIBER SERVICE PARAMETERS. Service parameters, such as a general level of service subscribed to by the subscriber, and such as logic that facilitates a determination of what type of service treatment to apply for the subscriber in a given instance. For example, a subscriber profile may indicate that if the subscriber is currently engaged in a particular data session (e.g., of a particular type or with a particular other party), a voice call should not should not be connected to the subscriber via the same or another terminal;

(4) CONTEXT REGISTER. An indication of the status of communications by the subscriber, such as an indication of whether the subscriber is engaged in a data session or a voice session, and on which terminal(s) the subscriber is currently communicating. Further, an indication of when each given session began and ended. May be used for accounting purposes as well.

Device profiles 194 may also take various forms. For example, each device profile may also take the form of a relational database record, which may define aspects of each subscriber terminal or type of subscriber terminal. By way of example, each record that defines a subscriber terminal may specify:

(1) TERMINAL IDENTIFIER. An identification of the terminal, such as a terminal serial number (e.g., electronic serial number (ESN), mobile identification number (MIN), or directory number).

(2) OWNER/SUBSCRIBER. An indication of the person, company or other entity that owns and/or operates the given terminal, such as by having subscribed to service in connection with the given terminal.

(3). CAPABILITIES. Indications of whether the terminal is landline or wireless, whether the terminal is capable of data communications (e.g., web browsing or other data messaging), whether the terminal is capable of voice communications (e.g., as a telephone for instance), whether the terminal is capable of video communications, whether the terminal is capable of communicating via a packet-based air interface, and so forth.

(4) SERVICE LEVEL. A service level prescribed for the terminal.

Other parameters can be provided as well or instead.

B. Exemplary System Operation

According to an exemplary embodiment of the invention, at session initiation or termination or during an ongoing session—whether voice, data or a combination thereof—, an entity that is involved with carrying out the session (which may be referred to as a session-processing entity), such as a WAG or session manager for instance, may send a signaling message that may provide the service agent layer with information about the session. The information can be information about the session generally, information about a specific packet or packets being conveyed in the session, or other such information. The following are some general categories of such information (by way of example only):

1. Session initiation time stamp.

2. Session address (e.g., origination and/or termination network address).

3. Session bearer channel information (e.g., an ID of the bearer path. As an example, if the session involves transmission of an RTP stream, this could be an ID of that stream. As another example, if the session involves transmission of control information, this could identify the session as a control session).

4. Identification of session participant (e.g., a MIN, ESN or other terminal identifier).

5. URL or other network address accessed by the subscriber in the data session (e.g., as indicated in a session initiation packet or packets).

6. Change of URL in a data session.
7. Data session ID number (e.g., a field indicating the data session to which the packet belongs).
8. Data session termination time stamp.

The service agent may then apply service logic so as to act on the information, possibly in combination with other information such as that defined by a subscriber profile and/or data profile, and perhaps information acquired from a location server, so as to determine a service treatment. The service agent may then send a signaling message indicating the service treatment, so that one or more policy enforcement engines can carry out the service treatment.

Thus, according to an exemplary embodiment of the invention, when a terminal seeks to initiate a session, it sends a session initiation request message to a WAG, providing the WAG with information about the proposed session, such as a destination address and type of session proposed. The message could be a SIP INVITE message for instance. The WAG then sends a session initiation request message to a session manager, providing the session manager with information about the proposed session. The message may also be a SIP INVITE message for instance. At this point, the WAG might be programmed to query a AAA server or the like and may thereby obtain basic service level information (such as bandwidth parameters for the proposed session) and may include that information in the session initiation request message that it sends to the session manager. Preferably, however, such a function is left to a session manager or even more preferably to a service agent.

Upon receipt of the session initiation request message, the session manager preferably sends a session initiation request message to a service agent, providing the service agent with information about the proposed session. The message may also be a SIP INVITE message. The session manager may be programmed to query a AAA-like server so as to obtain service level information and the like, and the session manager may also include that information in the message that it sends to the service agent.

Note that a WAG and/or a session manager may alternatively receive a request from some other entity seeking to establish a communication session with a terminal served by the WAG. This processing scenario can be extended to that process as well. Namely, if the WAG receives such a request, it may send a request to the session manager, and/or if the session manager receives such a request, it may send a request to the service agent.

Upon receipt of the session initiation request, the service agent then preferably executes a set of service logic, based on some or all of the information conveyed to it in the session initiation request message. The message may identify a subscriber, which may point the service agent to a particular subscriber profile, which may in turn point the service agent to a particular set of service logic and/or a particular device profile. Further, the service logic may cause the service agent to query a location server to determine the location of the terminal. The service agent may use the subscriber profile, one or more device profiles, location information, and/or other information or parameters as it applies its service logic. The service agent may thereby determine a service treatment.

The service treatment can take any of a variety of forms. Examples of service treatments on session initiation may include, without limitation, (i) to not allow the session, (ii) to change or, specify some parameter or information about the session such as to modify or specify a service level for the session, or to modify the destination address for the session, (iii) to begin decrementing a pre-paid service counter.

As an example, the service logic (in view of a subscriber profile) may establish that, if a given subscriber is currently engaged in a voice session as indicated by a context record for the subscriber or for a given terminal, the subscriber should not be interrupted with a proposed data session. As another example, the logic may establish that a proposed data session involving a particular remote entity (e.g., an objectionable web site for instance) should be blocked altogether for a particular subscriber or group of subscribers. As still another example, a subscriber may subscribe to a pre-paid data communication (e.g., web browsing) service, in which event, the logic may indicate that data communication sessions initiated by the subscriber should cause a pre-paid account to be decremented.

As yet a further example, the session initiation message that is sent to the service agent may indicate a service level for the proposed session. For instance, the WAG or session manager may determine (e.g., by querying a AAA server) that the service level for a given data session should be "best efforts," which may mean a low level of bandwidth and therefore relatively low quality level. The service logic employed by the service agent may establish, however, that for the given subscriber and/or terminal at issue, given a particular time of day or a particular other party involved in the proposed communication, for instance, the service level for the session should be increased to some better level. As a particular example, a subscriber profile may indicate that all communication sessions involving the subscriber during weekday business hours (e.g., 8:00 a.m. to 5:00 p.m. Monday through Friday) should be allotted a highest possible bandwidth. During that time period, the service agent may therefore conclude as at least part of a service treatment decision that bandwidth for the proposed session should be set at that high level.

As another example, the service logic employed by the service agent may result in a determination about handoff of a portable subscriber terminal from one serving system to another. To help illustrate this handoff-control example, FIG. 7 depicts a network 200 including at least two exemplary serving systems 202 and 204.

Serving system 202 is shown to include a BTS 206, which is coupled to a BSC 208, which is in turn coupled to a WAG 210. WAG 210 may then sit on a packet-switched network 212. In serving system 202, BTS 206 radiates to establish a cell that defines an air interface 214 over which a mobile station 216 may communicate. Assume for this example that BTS 206 communicates with mobile stations via a traditional channelized communication, and that signals from the mobile station pass to WAG 210 in a baseband, non-packetized form. Thus, serving system 202 may be viewed as a traditional circuit-switched system.

Serving system 204 is shown to include a BTS 220, which is coupled to a packet-switched network 222, and a WAG 224, which is also coupled to the packet-switched network 222. Network 222 may, for instance, be viewed as a packet-access network and/or a public packet network, such as networks 102 and 104 as shown in FIG. 3. BTS 220 radiates to establish a cell that defines an air interface 226 over which a mobile station may communicate. Assume further for this example that BTS 220 communicates with mobile stations via packet-based communication, and that signals from the mobile station may therefore pass from the mobile station to the BTS, through network 222 and to the WAG 224 in packetized form. Thus, serving system 204 may be viewed as a packet-switched system.

In the example, the WAGs of both systems are arranged to communicate with a session manager 230 (e.g., via one or more packet-switched networks or other links), and session manager 230 is arranged to communicate with a service agent 232. Assume further that mobile station 216 is capable of communicating over interface 214 and over interface 226.

Assume next that mobile station 216 is engaged in an ongoing data or voice session through WAG 210, when mobile station 216 is moved from serving system 202 to serving system 204, as shown by arrow 240 in FIG. 7. As mobile station 216 moves away from system 202 (and particularly away from BTS 206) and closer to system 204 (particularly BTS 220), BSC 208 may send a signaling message up to WAG 210, and WAG 210 may send a signaling message in turn to session manager 230. Session manager 230 might then seek to work with WAG 224 so as to facilitate a clean handoff of the session into system 204. However, in an exemplary embodiment, session manager 230 may instead (or additionally) send a signaling message to service agent 232, indicating information about the proposed communication session—and particularly, for instance, indicating the proposal to establish the communication session in packet-switched system 204.

Upon receipt of the signaling message, the service agent may execute a set of service logic, which may refer to subscriber and device profiles associated with mobile station 216 and may thereby determine that the mobile station is not permitted (pursuant to a subscriber agreement) to engage in communication in a packet-switched system such as system 204. Therefore, the service agent may establish as a service treatment that the communication session should be blocked from proceeding as the mobile station physically moves into system 204. (In a particularly robust embodiment, the service agent may further establish as a service treatment that a message (e.g., a short message service (SMS) message, or a voice message) should be sent to the mobile station indicating that service is precluded in the area being entered.

As another related but different example, the service agent may execute a set of service logic, which may establish as a service treatment that a particular service level or other parameter should be imposed on communications with the mobile station 216 over the packet-based air interface 226 (or other communication links) in system 204, when the mobile station moves into that system. For instance, if (as a packet-switched network) air interface 226 permits variations in bandwidth per communication session, the service treatment may indicate that communications with mobile station 216 should receive the highest level bandwidth possible. Advantageously, a subscriber or device profile for mobile station 216 referenced by a service agent layer as in the exemplary embodiment, can enable that highest service level to be imposed on air interfaces in any packet-switched system that mobile station 216 enters. Variations on this and other examples are of course possible as well.

In the exemplary embodiment, after the service agent determines a service treatment, the service agent preferably sends a signaling message off to a policy enforcement engine, to facilitate execution of the service treatment. The service agent may specify the service treatment in the signaling message by including a Java applet in the signaling message. In this regard, a SIP message may be arranged to carry Java payload, as described in an Internet Draft entitled "Java enhanced SIP", draft-odoherty-sip-java-enhanced-00.txt, dated March 2000, which is incorporated herein by reference. Alternatively, the service agent may specify the service treatment in the signaling message by including in the message a service treatment code that can be interpreted (e.g., by reference to a translation table) and acted upon by the enforcement engine. Other arrangements may be used to convey the service treatment as well.

The enforcement engine may be the session manager, for instance where the service treatment relates to establishing the proposed session. Alternatively, the policy enforcement engine may be the WAG, BSC or the BTS, for instance where the service treatment relates to functions carried out by those entities. (For example, if the service treatment is setting a service level for communications with mobile station 216 over air interface 226 of FIG. 7, then the enforcement engine might be BTS 220.) In that event, the service agent will preferably send the signaling message to the session manager, which may then forward the signaling message to the WAG, BSC or BTS for instance. These signaling messages can conveniently be SIP INVITE or OK messages, or it could take any other desired form.

Still alternatively, the policy enforcement engine might be some other entity or combination of entities not shown in the Figures. For example, if the service treatment is to push a video signal to mobile station 216 in FIG. 7, then the policy enforcement engine might be a video server that sits on network 222. The signaling message that the service agent sends might be a SIP INVITE message, which seeks to invite the video server to enter the mobile station's ongoing communication session. In FIG. 7, service agent 232 may pass the INVITE message to session manager 230, which may as a SIP proxy pass the message on to WAG 224, which similarly might as a SIP proxy pass the message onto the video server. The server may then accept the invitation and join the session, so as to push content to the mobile station. Still other examples are also possible.

Assuming that the service agent does not determine that the proposed session should be blocked, the service agent preferably records an indication in a context record for the subscriber and/or terminal, reflecting that the session has begun. As noted above, this context record may be used for accounting purposes, including pre-payment accounting and post-processing billing. It may also be used for other purposes as well.

Further, according to the exemplary embodiment, the service agent also preferably responds by sending a basic set of trigger logic to the session manager for receipt and use by a session processing entity such as the session manager and/or the WAG, in connection with the proposed communication session. The session manager may in turn be programmed to forward some or all of the trigger logic to the WAG for instance. Upon receipt of such trigger logic, the session processing entity may store the logic in its data storage medium, such as in a record keyed to a session ID (an identification of the particular session) for instance.

As a general matter, the trigger logic may indicate certain criteria in response to which the session processing entity is to seek service assistance during the course of the ongoing session (and/or upon conclusion thereof). The criteria may therefore vary depending on factors such as the tasks performed by the session processing entity for instance. Further, the trigger logic may include pointers (e.g., network addresses) of entities to whom the session processing entity should direct a signaling message in response to satisfaction of the designated criteria.

For instance, the WAG may receive a set of trigger logic that may define basic packet-filtering parameters or a packet-filtering function. Advantageously, the WAG processor may use the logic to examine packets of the session as the WAG receives and/or transmits the packets, and to thereby extract information about (i.e., out of, or concerning) the communication session (i.e., one or more packets or the session generally). For instance, the logic may indicate that, if one or more packets satisfies given criteria (such as if a packet is of a certain type or its header or payload contains certain information), the WAG should send a signaling message up to the session manager to seek service guidance. The signaling message may even be a SIP INVITE message, which seeks to invite the service agent to participate, so as to facilitate having the message be forwarded up to the service agent. When the service agent receives the signaling message, the service agent may then establish a service treatment.

The session manager may, similarly, receive a set of trigger logic that defines session specific criteria. For example, if the service agent determines on the initiation of a data session for a given subscriber that the subscriber is not to be interrupted with any voice calls on another terminal during the data session (e.g., if the data session is an Internet session with the subscriber's personal computer connected to the Internet via a cable modem, the subscriber is not to receive any incoming PSTN telephone calls during the data session), then the service agent may send voice-call trigger logic to the session manager. The voice-call trigger logic may indicate that if the session manager receives a session initiation request from any entity seeking to establish a voice session with the subscriber, the session manager should send a signaling message up to the service agent. The signaling message may be a SIP INVITE message for instance.

Upon receipt the signaling message, the service agent may then readily execute a set of service logic for the subscriber to determine if the subscriber is currently engaged in a data session (as indicated by a context record for the subscriber, for instance) and, if so, whether the proposed voice call should be blocked or perhaps forwarded to a designated voice mail platform for the subscriber. As another example, the service agent may determine that a text message should be pushed into the subscriber's data session, so as to inform the subscriber that the voice call is incoming (thereby facilitating a sort of Internet call waiting functionality for instance).

Once the session commences, one or more session-processing entities (such as the WAG and/or the session manager) may then apply their basic trigger logic to the communication session, conveniently regardless of whether the session is a data session and/or a voice session. For example, the WAG may apply a packet-filtering function designated for the given data session so as to detect any packet or packet sequence representing a request from the mobile station to navigate to a particular web site, such as at a particular network address as indicated by a uniform resource locator (URL) for instance.

Based on the basic trigger logic, in response to such a packet or packets, the WAG may then send a signaling message up to the session manager, which the session manager may forward in turn to the service agent. The signaling message may identify the URL or other address of the proposed site. The service agent may then apply service logic based on a subscriber and/or device profile so as to determine a service treatment. In a particular example, the subscriber profile may indicate that the subscriber is not permitted to connect to the designated site, and that perhaps in response to an effort to so connect, the subscriber terminal should be connected to some other predetermined URL or address. The service agent may then send a return signaling message via the session manager to the WAG, so as to modify the proposed URL or address of the packet.

As another, albeit extreme, example, the trigger logic provided to a WAG may indicate that the WAG should signal up to the session manager in response to every packet that it receives in a given communication session. The session manager may then in turn send a signaling message up to the service agent, which may employ service logic, determine a service treatment and send a signaling message down for imposition by a policy enforcement engine. While such a system may bog down transmissions given presently available processing power and processing speeds, it is envisioned that at some point in the future processing power and processing speeds may be sufficient to handle packet filtering and imposition of service on a per-packet basis.

As an alternative, rather than or in addition to having the service agent or other such entity send a set of trigger logic to a session-processing entity, the session-processing entity may be pre-programmed with a set of trigger-logic. Such logic may indicate, for instance, that, in any session, a packet or packets of a certain type or carrying certain information should cause the session-processing entity to signal to another entity such as a service agent. The service agent may then determine a service treatment to be imposed.

In an exemplary embodiment, upon completion of a session, a WAG and/or a session manager may send a signaling message ultimately up to the service agent. The service agent may then update the context record for the session, subscriber and/or terminal so as to reflect that the session is completed.

Advantageously, in the exemplary embodiment, since the WAG sits on a packet switched network and the WAG may engage in packet-filtering—and particularly if the WAG is a policy enforcement engine for the network on which it sits (such as a LAN server for instance), the WAG may also serve as a gateway to facilitate imposition of services on other entities in the network.

For example, a corporate WAG may be disposed on a corporate LAN (local area network) that is interconnected to (i.e., part of) the Internet or other packet-switched network. The WAG may, for instance, be integrated functionally as part of the LAN server and/or PBX server. One or more terminals (e.g., computers, personal data assistants, etc.) may reside on the LAN as well, whether through landline or wireless connections. Each terminal on the LAN may be arranged to engage in packet-based sessions via the WAG. These sessions may be landline or wireless or a combination thereof, and could involve any communication protocols (such as for example, CDMA, Bluetooth and JINI). With this extension, the WAG can readily enforce policies for communications with any of the terminals on the LAN or PBX. In effect, then, the policies maintained by the service agent in one private network or public network may be imposed on terminals in another private network or public network.

Referring back to FIG. 3, for example, session initiations or any other traffic that flows through network 102, such as through gateway 116, could pass through WAG 112. WAG 112 may therefore be arranged to signal to session manager 108 in response to any such traffic (as indicated by local trigger logic for instance). In turn, session manager 108 may signal to service agent 110, which may then derive a service treatment. A signaling message indicating the service treatment may then be passed back to WAG 112, which may then enforce the designated service treatment.

C. ADDITIONAL EXAMPLES OF OPERATION

The following several examples will help to further illustrate how an exemplary embodiment of the invention may operate in practice.

Example 1

A user operates a web-enabled mobile station (e.g., cellular telephone or wireless PDA) to initiate a web browsing session. The user inputs the Internet address (e.g., URL) of Bookstore.com, which is then conveyed as a packet-based session initiation request via the BTS to the WAG, with a header service option ID indicative of a data session. Upon receipt of the session initiation request, the WAG notes that the new session is a data session. Therefore, the WAG sends a query to the session manager, asking the session manager what to do with the initiation request. The session manager, not knowing what to do with the initiation request, then queries the service agent. Preferably, these queries carry information about the requested session, including (i) an identity of the mobile station (e.g., a mobile identification number (MIN)) and (ii) the requested termination address (e.g., the IP address of Bookstore.com).

Upon receipt of the query, the service agent may then determine that it does not have a service profile for the mobile station. (The absence of a service profile may occur for any of a variety for reasons. For example, it could be because the mobile station is roaming, because the mobile's registration has been lost, or for any other reason.) In response, the service agent may consult a register (database) on the Internet, on a core packet network or elsewhere so as to learn the identity of the mobile station's home service agent (HSA). The service agent may then query the HSA to find out what service to dictate for the session, passing to the HSA information about the proposed session. In turn, the HSA may apply an applicable set of service logic in view of a subscriber profile for the mobile station.

In this example, the logic may dictate that packets sent to Bookstore.com from this mobile station should be sent to the Spanish language version of Bookstore.com, which may be located at Bookstore-Spanish.com. In response, the HSA may instruct the service agent to have the packets routed to that alternate address, and the service agent may send that instruction to the session manager. The session manager may then communicate with a server associated with the Bookstore-Spanish.com site to set up a session between the WAG and that server, and the session manager may instruct the WAG accordingly to send the packets of the session to Book store-Spanish.com instead of to Bookstore.com. The WAG may record this directive in its memory and may then carry out the directive as it receives packets of the session from the mobile station.

Example 2

In the example above, the mobile station's profile at the HSA may indicate that, when the mobile station attempts to initiate a data session with Bookstore.com, the HSA should send an electronic coupon (e-coupon) for Bookwarehouse-.com to the mobile station. Therefore, when the HSA receives the query, the HSA may send a Bookwarehouse-.com e-coupon to the mobile station as an industry standard short message service (SMS) message for instance. Alternatively, the HSA may send a message to Bookwarehouse.com, and Bookwarehouse.com may responsively send the e-coupon to the mobile station.

Example 3

A user operating a computer on the Internet seeks to send a text message to a network address that is associated with a mobile station. Unfortunately, however, the mobile station does not have text display capabilities. However, the mobile station is operating in a serving system in which the BTS resides on a local packet-switched network and is in communication with the network via a WAG. When packets representing the text message arrive at the local network for the mobile station, the WAG receives the packets. On session initiation, the WAG then queries the session manager to find out what to do with the session, and the session manager, in turn, queries the service agent. These queries may indicate (i) the originating IP address, (ii) the terminating IP address, and (iii) the type of data transmission, namely, text.

Upon receipt of the query, the service agent may consult a profile of the mobile station to which the session is to be terminated. The profile may indicate that the mobile station is incapable of receiving or displaying text messages. Alternatively, the service agent may consult a device registry that indicates the mobile station is capable of only voice-band communications and is unable to display text messages. The service agent may then notify the session manager that the terminating mobile station is a voice-only device, while the incoming data session is text-based.

In response, the session manager may apply logic to determine that some conversion must take place in order to facilitate completion of the communication from the computer to the mobile station. In particular, the session manager may conclude that the text message received in packets from the computer needs to be converted into a speech message for receipt by the mobile station. Therefore, the session manager may instruct the WAG to (i) depacketize the stream of packets in the session, (ii) speech synthesize the underlying text message to produce a speech signal, (iii) digitize and packetize the speech signal, and (iv) send the resulting packets to the mobile station. As a result, based on the mobile station's profile, incoming text messages are converted into incoming speech messages that can be audibly played by the mobile station.

Example 4

The service agent may maintain a subscriber profile indicating that if the subscriber is engaged in a data session with a particular remote address (such as a particular URL, for instance), the system should or should not allow voice calls to be connected to the subscriber. In operation, then, the service agent would become aware of the fact that the subscriber is engaged in such a data session, because, upon initiation of the session, the WAG would query the session manager, which would then query the service agent. In turn, the service agent would become aware of an attempt to connect a voice call to the subscriber, because, upon such a termination attempt, the WAG would query the session manager, which would then query the service agent as well.

The service agent may then apply the subscriber profile, to determine whether the requested voice session should be established with the subscriber, based on the address with whom the subscriber is currently engaged in a data session. And the service agent may instruct the session manager accordingly, which may then instruct the WAG. The WAG may then carry—out the instructions.

Example 5

A subscriber is in the middle of a web-browsing (data) session via a point-to-point connection over a telephone line with an Internet Service Provider (ISP), when a voice call is placed to the subscriber at that telephone line. Today, the voice call would receive a busy signal, would be passed to voice mail, or would go unanswered. To solve this problem, some telephone companies have begun to offer an Internet-call-waiting service by which a message can be made to pop up on the subscriber's computer screen, advising the subscriber that the voice call is incoming. In operation, existing internet-call-waiting functionality involves a local software application on a subscriber's computer, which sends a message to the subscriber's local telephone company office indicating that the subscriber is engaged in a web session. When a voice call comes in, then, the telephone company can send a message via the Internet to the subscriber's computer, which the software application on the computer can receive and respond to by popping up a call-waiting message on the subscriber's computer screen.

With the benefit of an exemplary embodiment of the present invention, in contrast, Internet-call-waiting functionality can be readily provided without the need to install an application on the subscriber's computer (or other such terminal.) The service agent may be provisioned with logic to indicate that, in response to an incoming voice call to a given subscriber when the subscriber is engaged in a data session, the WAG handling the data session should insert a message to the subscriber's terminal indicating that the voice call is incoming. Further, the message may prompt the subscriber to select what should be done with the call, and a response signal provided by the subscriber can be passed in a signaling message to the service agent, and the service agent may responsively direct a policy enforcement engine to act accordingly. (As shown by this example, a subscriber may thus direct the service agent.)

Example 6

A subscriber profile may indicate that the user is barred from initiating communications with particular web sites on the Internet. When a subscriber then seeks to engage in a data session with a particular remote address, such as www.badsite.com, for instance, the service agent can instruct the session manager to disallow the session.

D. CONCLUSION

An exemplary embodiment of the present invention has been described herein. It will be understood, however, that changes and modifications may be made thereto without deviating from the true spirit and scope of the invention as defined by the claims. For instance, where appropriate, individual elements described herein may be substituted with other equivalent elements now known or later developed. All examples described herein are illustrative and not necessarily limiting.

For example, although the description has referred to a wireless access gateway, which interfaces with a wireless communications system, it should be understood that other access gateways or network nodes may be substituted. Further, such a gateway or node could serve as an access point or router for any type of communication traffic from any type of access medium (e.g., landline, wireless, circuit-switched or packet-switched). Similarly, the session manager may take various forms as well.

For instance, the well known industry standard H.323 defines a "gateway" entity, such as an ISP modem for example, which may receive communication signals from an H.323 terminal and may then route into a packet-switched network a packet sequence corresponding to those communication signals. An H.323 gateway can query an H.323 gatekeeper, such as to determine authorization or service level for communications. According to an exemplary embodiment, a gateway may be arranged to signal to a gatekeeper on session initiation and during the course of a session, e.g., based on a packet-filtering function, and the gatekeeper can in turn signal to service agent layer, so as to facilitate determination of a service treatment.

As another example, instead of or in addition to employing a "wireless access gateway" as described above, a "session filter" could be placed elsewhere in the line of communication, such as on the A1/A2 IOS interface between a BSC and PDSN, or on the A10/A11 IOS interface between a BSC and an MSC. The session filter could be a logic device (such as a programmed processor, for instance) through which traffic may pass. The traffic may be circuit-switched (e.g., frame relay, ISDN, etc.), packet-switched (e.g., IP, ATM, etc.) or any other form now known or later developed.

Being inserted into the line of communication, the session filter may employ logic (e.g., trigger logic as described above) to extract information about the traffic being communicated and may then responsively send a signaling message to another entity, to facilitate application of service agent logic as described above. For instance, the session filter may extract from live traffic an indication of a service option, mobile identification number, dialed digits, etc., and may responsively generate and send to a service agent a signaling message. The service agent may then carry out a set of service logic so as to derive a service treatment, and that service treatment may then be imposed.

Further, the session filter may function as a packet gateway, or the session filter may communicate with a packet gateway, so as to interface bearer traffic with a packet-switched network. By positioning the session filter on a circuit-switched communication path, this arrangement may thus function as a mechanism to assist in transitioning from circuit-switched communications to packet-switched communications.

We claim:

1. A method for providing services in a communications network, the method comprising:

sending a first signal to a service agent upon initiation of a communication session;

the service agent executing a set of service logic in response to the first signal and thereby determining a first service treatment;

carrying out the first service treatment;

during the communication session, extracting information about the communication session and responsively sending a second signal to the service agent;

the service agent executing a second set of service logic in response to the second signal and thereby determining a second service treatment; and carrying out the second service treatment.

2. The method of claim 1, wherein the communication session comprises a data communication session.

3. The method of claim 1, wherein the communication session comprises a voice communication session.

4. A method for providing services in a communications system in which a first entity routes packets of a communication session, the method comprising:

the first entity extracting information about the communication session and responsively sending a first signaling message to a second entity, the first signaling message defining the information;

the second entity receiving the first signaling message and sending a second signaling message to a third entity, the second signaling message defining the information;

the third entity executing a set of service logic based at least in part on the information and thereby deriving a service treatment; and the fourth entity sending a fourth signaling message to the second entity including an indication of the service treatment, whereby the service treatment may then be imposed.

5. A service agent layer for managing communication services, the service agent layer maintaining a record of states of communication sessions associated with a subscriber, including a record of a state of a first communication session, the service agent layer receiving information about a second communication session associated with the subscriber and the service agent layer being arranged to responsively determine a service treatment based at least in part on state of the first communication session, wherein the first communication session comprises a data session, the second communication session comprises a voice session, and the information about the second communication session comprises information indicating that a request has been made to initiate the second communication session, wherein the service treatment comprises pushing content into the first communication session so as to notify the subscriber of the second session.

6. A system comprises, a service agent layer for managing communication services, the service agent layer maintaining a record of states of communication sessions associated with a subscriber, including a record of a state of a first communication session, the service agent layer receiving information about a second communication session associated with the subscriber and the service agent layer being arranged to responsively determine a service treatment based at least in part on state of the first communication session, wherein the service agent layer is arranged to send to a network entity a signaling message indicating the service treatment, whereby the network entity may carry out the service treatment.

7. A method for imposing services in a communications network, the method comprising:

receiving a number of data packets associated with a communication session;

acquiring information about the communication session based on at least one of the data packets;

providing to a service agent a first signaling message indicating the information about the communication session;

based at least in part on the information about the communication session as indicated by the signaling message, determining a service treatment; and imposing the service treatment;

wherein receiving the number of data packets associated with the communication session comprises receiving the number of data packets at an access gateway that serves as an interface with a communications network; and wherein providing the first signaling message to the service agent comprises sending the first signaling message from a session manager to the service agent.

8. The method of claim 7 wherein imposing the service treatment comprises:

the service agent sending to the session manager a second signaling message indicative of the service treatment; and the session manager carrying out the service treatment.

9. The method of claim 8, wherein the first signaling message comprises a SIP message having a first set of parameters, and the second signaling message comprises the SIP message having a second set of parameters that is a modified version of the first set of parameters.

10. The method of claim 7, wherein the session manager carrying out the service treatment comprises:

the session manager directing the access gateway to carry out the service treatment.

11. A method for imposing services in a communications network, the method comprising:

receiving a number of data packets associated with a communication session;

acquiring information about the communication session based on at least one of the data packets;

providing to a service agent a first signaling message indicating the information about the communication session;

based at least in part on the information about the communication session as indicated by the signaling message, determining a service treatment; and imposing the service treatment, wherein the service agent has access to a subscriber profile and service logic, and wherein the service agent determining a service treatment comprises the service agent applying the service logic based at least in part on the information and the subscriber profile, and thereby identifying the service treatment.

12. A method for imposing services in a communications network, the method comprising:

receiving a number of data packets associated with a communication session;

acquiring information about the communication session based on at least one of the data packets;

providing to a service agent a first signaling message indicating the information about the communication session;

based at least in part on the information about the communication session as indicated by the signaling message, determining a service treatment; and imposing the service treatment, wherein the service agent has access to a subscriber profile and service logic, and wherein the service agent determining a service treatment comprises the service agent applying the service logic based at least in part on the information and the subscriber profile, and thereby identifying the service treatment; and wherein applying the service logic based at least in part on the information and the subscriber profile comprises (i) querying a location server to determine a subscriber location, and (ii) applying the service logic based at least in part on the information, the subscriber location and the subscriber profile.

13. A method for imposing services in a communications network, the method comprising:

receiving a number of data packets associated with a communication session;

acquiring information about the communication session based on at least one of the data packets;

providing to a service agent a first signaling message indicating the information about the communication session;

based at least in part on the information about the communication session as indicated by the signaling message, determining a service treatment; and imposing the service treatment;

wherein the service agent maintains a context record for the communication session and wherein the service agent determining the service treatment comprises determining the service treatment based at least in part on a parameter indicated by the context record.

14. A method for imposing services in a communications network, the method comprising:

receiving a number of data packets associated with a communication session;

acquiring information about the communication session based on at least one of the data packets;

providing to a service agent a first signaling message indicating the information about the communication session;

based at least in part on the information about the communication session as indicated by the signaling message, determining a service treatment; and imposing the service treatment;

wherein the information about the communication session comprises information selected from the group consisting of (i) session origination address, (ii) session termination address, (iii) session timestamp, (iv) bearer channel identification, (v) subscriber terminal identification, (vi) last known address accessed, (vii) session identification, (viii) service-level information, and (ix) communication type.

15. The method of claim 14, wherein acquiring information about the communication session based on at least one of the data packets comprises acquiring from at least one of the data packets information selected from the group consisting of header information and payload information.

16. A method for imposing services in a communications network, the method comprising:

receiving a number of data packets associated with a communication session;

acquiring information about the communication session based on at least one of the data packets;

providing to a service agent a first signaling message indicating the information about the communication session;

based at least in part on the information about the communication session as indicated by the signaling message, determining a service treatment; and imposing the service treatment;

wherein the service treatment comprises a treatment selected from the group consisting of (i) blocking the communication session, (ii) blocking a handoff of the communication session from one serving system to another, (iii) applying a quality-of-service level, (iv) rerouting the communication session, (v) pulling back the communication session, and (vi) pushing content into the communication session.

17. A system for imposing service treatment on communication sessions, the system comprising:

a service agent having access to subscriber profiles and service logic;

a session manager for setting up and managing communication sessions in a communications network;

a gateway for interfacing data packets between subscriber terminals and the communications network, the data packets being associated with a communication session, the gateway being programmed to acquire information about the communication session based on at least one of the data packets and to send to the session manager a first message indicating the information about the communication session;

the session manager being programmed to respond to the first message at least in part by sending to the service agent a second message indicating the information about the communication session; and the service agent being programmed to respond to the second message at least in part by using the information about the communication session to determine a service treatment for the communication session and then sending to the session manager a third message indicative of the service treatment.

18. The system of claim 17, wherein each data packet of the number of data packets carry header information and payload information, and wherein the payload information of the number of packets cooperatively represents an underlying signal selected from the group consisting of a voice signal and a data signal.

19. The system of claim 17, wherein:

the second message defines a quality-of-service level for the communication session;

the service treatment comprises modifying quality-of-service level for the communication session; and the third message indicates a modified quality-of-service level for the communication session, whereby the session manager may apply the modified quality-of-service level for the communication session.

20. The system of claim 17, wherein the third message comprises a modified version of the second message.

21. The system of claim 20, wherein the second message comprises a SIP INVITE message having a first set of parameters, and the third message comprises the SIP INVITE message having a second set of parameters that is a modified version of the first set of parameters.

22. The system of claim 17, wherein:

the service agent has access to a set of service logic; and the service agent applies the service logic to determine the service treatment.

23. The system of claim 22, wherein:

the service agent further has access to a subscriber profile; and the service agent applies the service logic based at least in part on the subscriber profile, to determine the service treatment.

24. The system of claim 17 wherein the service agent functions as a portal to at least one service logic engine, wherein the service agent is programmed to forward information about the communication to the at least one service logic engine, to facilitate determination of the service treatment.

25. The system of claim 24, wherein the service agent manages interaction between service logic applied by a plurality of service logic engines.

26. The system of claim 17, wherein the subscriber terminals comprise a terminal selected from the group consisting of (i) a wireless subscriber terminal and (ii) landline subscriber terminal.

27. The system of claim 17, wherein:

the service agent has access to a device register;

the service treatment comprises converting between communication protocols employed by multiple terminals; and the service agent refers to the device register to determine the service treatment.

28. A system for imposing services in a communications network, the system comprising:

a gateway layer arranged to route packets of communication sessions between subscriber terminals and transport networks, the gateway layer being programmed to extract information from the communication sessions;

a session manager separate from the gateway layer, arranged to set up communication sessions for the gateway layer; and a service agent layer separate from the session manager layer and gateway layer, arranged to manage services for communication sessions;

wherein, (i) the gateway layer determines information about a session, and the gateway layer responsively sends the information to the session manager layer, (ii) the session manager layer thereafter sends the information to the service agent layer (iii) and the service agent layer thereafter applies service logic based at least in part on the information, so as to determine a service treatment to be imposed, whereby the service treatment may then be imposed.

29. The system of claim 28, wherein the service agent layer defines a service-level for the session.

30. The system of claim 28, wherein the service treatment is carried out by a layer selected from the group consisting of (i) the session manager layer and (ii) the gateway layer.

31. The system of claim 28, wherein the service treatment relates to handoff of a communication session from one serving system to another.

32. The system of claim 28, wherein the service treatment relates to handoff of a communication session from a circuit-switched system to a packet-switched system.

33. The system of claim 28, further comprising a location server layer separate from the service agent layer, the session manager layer and the gateway layer, arranged to maintain information indicative of locations of subscriber terminals, wherein the service agent layer communicates with the location server layer to obtain location information for a subscriber terminal, and the service agent layer applies the service logic based at least in part on the location information, so as to determine the service treatment to be imposed.

* * * * *

UNITED STATES PATENT AND TRADEMARK OFFICE
CERTIFICATE OF CORRECTION

| | | |
|---|---|---|
| PATENT NO. | : 6,944,150 B1 | Page 1 of 1 |
| DATED | : September 13, 2005 | |
| INVENTOR(S) | : Von K. McConnell, Kenneth C. Jackson and Bryce A. Jones | |

It is certified that error appears in the above-identified patent and that said Letters Patent is hereby corrected as shown below:

<u>Title page,</u>
Item [75], Inventors, add -- Bryce A. Jones --.

Signed and Sealed this

Thirtieth Day of May, 2006

JON W. DUDAS
*Director of the United States Patent and Trademark Office*